US011922878B2

(12) United States Patent
Zhang

(10) Patent No.: US 11,922,878 B2
(45) Date of Patent: *Mar. 5, 2024

(54) DISPLAY PANEL AND DISPLAY DEVICE

(71) Applicant: Xiamen Tianma Display Technology Co., Ltd., Xiamen (CN)

(72) Inventor: Yuheng Zhang, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,100

(22) Filed: Dec. 23, 2022

(65) Prior Publication Data

US 2023/0127605 A1 Apr. 27, 2023

Related U.S. Application Data

(63) Continuation of application No. 17/646,615, filed on Dec. 30, 2021, now Pat. No. 11,538,412.

(30) Foreign Application Priority Data

Sep. 13, 2021 (CN) ......................... 202111071013.4

(51) Int. Cl.
*G09G 3/3233* (2016.01)

(52) U.S. Cl.
CPC ... *G09G 3/3233* (2013.01); *G09G 2300/0842* (2013.01); *G09G 2310/0251* (2013.01); *G09G 2310/08* (2013.01); *G09G 2320/02* (2013.01); *G09G 2320/0247* (2013.01); *G09G 2320/045* (2013.01); *G09G 2320/0626* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 11,468,814 B1 * | 10/2022 | Zhang | ....................... | G09G 3/20 |
| 11,538,412 B1 * | 12/2022 | Zhang | .................. | G09G 3/3233 |
| 2017/0263183 A1 * | 9/2017 | Lin | ...................... | G09G 3/3233 |
| 2018/0075801 A1 * | 3/2018 | Le | ........................ | G09G 3/3233 |
| 2019/0057646 A1 * | 2/2019 | Lin | ...................... | G09G 3/3225 |
| 2020/0226978 A1 * | 7/2020 | Lin | ...................... | G09G 3/3233 |
| 2021/0104196 A1 * | 4/2021 | Yuan | .................... | G09G 3/3258 |
| 2021/0375193 A1 * | 12/2021 | Son | ...................... | G09G 3/3233 |
| 2023/0116780 A1 * | 4/2023 | Zhang | .................. | G09G 3/3233 345/691 |

* cited by examiner

*Primary Examiner* — Dorothy Harris
(74) *Attorney, Agent, or Firm* — Anova Law Group, PLLC

(57) ABSTRACT

A display panel includes: a pixel circuit, and a light-emitting element, that the pixel circuit includes a driving transistor configured to provide a driving current for the light-emitting element; a working process of the pixel circuit includes a data writing stage, in which a gate of the driving transistor receives a data signal, and a bias adjustment stage, in which a source or drain of the driving transistor receives a bias adjustment signal; and the pixel circuit has a frame refresh frequency F1, and a data refresh frequency including a first data refresh frequency F11 and a second data refresh frequency F22, that at least one second data refresh period includes N11 bias adjustment stages, a bias adjustment signal V11 is inputted in a first bias adjustment stage, and a bias adjustment signal Vi is inputted in an i-th bias adjustment stage, where V11≠Vi.

29 Claims, 17 Drawing Sheets

DISPLAY PANEL AND DISPLAY DEVICE

CROSS-REFERENCE TO RELATED APPLICATION

This application is a continuation of application Ser. No. 17/646,615, filed on Dec. 30, 2021, which claims the priority of Chinese Patent Application No. CN202111071013.4, filed on Sep. 13, 2021, the entire contents of all of which are incorporated herein by reference.

FIELD OF THE DISCLOSURE

The present disclosure generally relates to the field of display technologies and, in particular, relates to a display panel and a display device.

BACKGROUND

A display panel often uses different refresh rates to display in different application scenarios. For example, a driving mode with a higher refresh rate is configured to drive a display of dynamic images (such as in sports events or game scenes) to ensure smoothness of the display; and a driving mode with a lower refresh rate is configured to drive a display of slow-motion images or static images to reduce power consumption.

When the display panel is directly switched from a high refresh rate to a low refresh rate, there is a problem of abnormal brightness in a first frame with the low refresh rate, which means that a screen flickering phenomenon occurs and visual experience is affected.

BRIEF SUMMARY OF THE DISCLOSURE

One aspect of the present disclosure provides a display panel, including: a pixel circuit, and a light-emitting element, that the pixel circuit includes a driving transistor configured to provide a driving current for the light-emitting element; a working process of the pixel circuit includes a data writing stage and a bias adjustment stage, that a gate of the driving transistor receives a data signal in the data writing stage, and a source or drain of the driving transistor receives a bias adjustment signal in the bias adjustment stage; a frame refresh frequency of the pixel circuit is F1, and a frame includes a data writing frame and a holding frame; and a data refresh frequency of the pixel circuit includes a first data refresh frequency F11 and a second data refresh frequency F22, $F22<F11\leq F1$, that at least one second data refresh period includes N11 bias adjustment stages, $N11\geq 2$, a bias adjustment signal V11 is inputted in a first bias adjustment stage of the second data refresh period, and a bias adjustment signal Vi is inputted in an i-th bias adjustment stage, $1<i\leq N11$, where $V11\neq Vi$.

Another aspect of the present disclosure provides a display panel, including: a pixel circuit, and a light-emitting element, that the pixel circuit includes a driving transistor configured to provide a driving current for the light-emitting element; a working process of the pixel circuit includes a data writing stage and a bias adjustment stage, that a gate of the driving transistor receives a data signal in the data writing stage, and a source or drain of the driving transistor receives a bias adjustment signal in the bias adjustment stage; a frame refresh frequency of the pixel circuit is F1, and a frame includes a data writing frame and a holding frame; and a data refresh frequency of the pixel circuit includes a first data refresh frequency F11 and a second data refresh frequency F22, $F22<F11\leq F1$, that after the data refresh frequency of the pixel circuit is switched from the first data refresh frequency F11 to the second data refresh frequency F22, one second data refresh period includes N11 bias adjustment stages, $N11\geq 2$, a bias adjustment signal Vm is inputted in a m-th bias adjustment stage of the second data refresh period, and a bias adjustment signal Vn is inputted in an n-th bias adjustment stage, $1\leq m\leq N11$, $1\leq n\leq N11$, $m<n$, where $Vm\neq Vn$.

Another aspect of the present disclosure provides a display panel, including: a pixel circuit, and a light-emitting element. The pixel circuit includes a driving transistor configured to provide a driving current for the light-emitting element. A working process of the pixel circuit includes a data writing stage and a bias adjustment stage. A gate of the driving transistor receives a data signal in the data writing stage, and a source or drain of the driving transistor receives a bias adjustment signal in the bias adjustment stage. The pixel circuit includes different data refresh frequencies. At least one data refresh period includes N11 bias adjustment stages, $N11\geq 2$. A bias adjustment signal V11 is inputted in a first bias adjustment stage of the data refresh period. A bias adjustment signal Vi is inputted in an i-th bias adjustment stage, $1<i\leq N11$, where $V11\neq Vi$.

Another aspect of the present disclosure provides a display device, including the disclosed display panel.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions of the present disclosure, the accompanying drawings used in the description of the disclosed embodiments are briefly described hereinafter. The following drawings are merely examples for illustrative purposes according to various disclosed embodiments and are not intended to limit the scope of the present disclosure. Other drawings may be derived from such drawings by a person with ordinary skill in the art without creative efforts.

DETAILED DESCRIPTION

Technical solutions in various embodiments of the present disclosure will be clearly and completely described below in conjunction with the accompanying drawings in the embodiments of the present disclosure. It is obvious that the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

When a display panel adopting organic self-luminous technology is directly switched from a high refresh rate to a low refresh rate, there is a problem of abnormal brightness in a first frame with the low refresh rate, that is to say, a screen flickering phenomenon occurs, and visual experience is affected. Specifically, when the display panel is switched from a high-frequency data refresh rate driving mode to a low-frequency data refresh rate driving mode, because when the display panel adopts the high-frequency data refresh rate driving mode to drive a display, in a data refresh period, a number of holding frames is zero or the number of holding frames is small, a gate of a driving transistor holds an input of a data signal, that is, a gate potential of the driving transistor is refreshed more frequently. When the display panel adopts the low-frequency data refresh rate driving mode to drive a display, the number of holding frames in the data refresh period becomes relatively larger. In the data refresh period, the gate potential of the driving transistor remains constant for a long time. However, when a pixel circuit in the display panel is in a light-emitting stage, the driving transistor may work in a non-saturated state. For a PMOS type driving transistor, there may be a situation that the gate potential is higher than a drain potential when the driving transistor is turned on. For an NMOS driving transistor, there may be a situation that the gate potential is lower than the drain potential when the driving transistor is turned on. Maintaining the above situations for a long time leads to ion polarization inside the driving transistor, which in turn forms a built-in electric field inside the driving transistor, causing a threshold voltage of the driving transistor to continuously shift.

Figure 1:
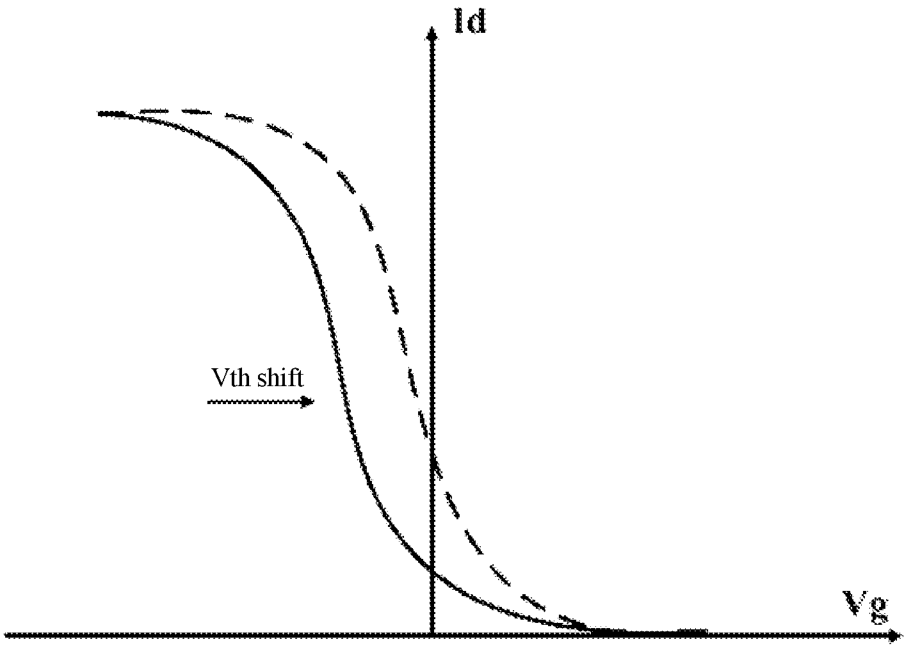
FIG. 1 illustrates Id-Vg curve drift of a driving transistor.

Referring to FIG. 1, FIG. 1 illustrates Id-Vg curve drift of a driving transistor. As shown in FIG. 1, an Id-Vg curve shifts, which in turn causes a threshold voltage Vth of a driving transistor to shift, thereby resulting in unstable input signal of the driving transistor. Therefore, when the display panel is switched from the high-frequency data refresh rate driving mode to the low-frequency data refresh rate driving mode, the problem of abnormal brightness occurs, that is to say, the screen flickering phenomenon occurs and the visual experience is affected.

To solve the above-mentioned technical problems in existing technologies, in the present disclosure, by providing bias adjustment stages, a bias adjustment signal is inputted to a source or drain of a driving transistor, to adjust a drain potential of the driving transistor and improve a potential difference between a gate potential and the drain potential of the driving transistor, thereby reducing a degree of ion polarization inside the driving transistor, and lowering a threshold voltage of the driving transistor, to ensure that an Id-Vg curve does not shift as much as possible. As a result, when a display panel is switched from the high-frequency data refresh rate driving mode to the low-frequency data refresh rate driving mode, the problem of abnormal brightness does not occur, which means that the screen flickering phenomenon does not occur, and the visual experience is improved.

However, because in a high-frequency data refresh frequency driving stage, a signal received by the driving transistor most of the time is a data signal, when switching to a low data refresh frequency, and when a first bias adjustment stage comes, in the first bias adjustment stage, the signal received by the driving transistor is suddenly changed to a bias adjustment signal, which causes a sudden change in the signal received by the driving transistor. Especially when the bias adjustment signal is significantly different from the data signal, the sudden change is more obvious, thereby causing instability of the driving transistor, which in turn affects a driving current, and ultimately affects brightness of a light-emitting element.

Based on this, multiple bias adjustment stages are provided in the present disclosure, and a bias adjustment signal of each bias adjustment stage is different, that is, it is tried to make the bias adjustment signal gradually change to a fixed value in a gradual manner, thereby avoiding the problem of abnormal brightness when the display panel is switched from the high-frequency data refresh rate driving mode to the low-frequency data refresh rate driving mode. In other words, the screen flickering phenomenon is avoided, and the visual experience is improved.

To make the above objectives, features and advantages of the present disclosure more obvious and understandable, the present disclosure will be further described in detail below in conjunction with the accompanying drawings and various embodiments.

Figure 2:
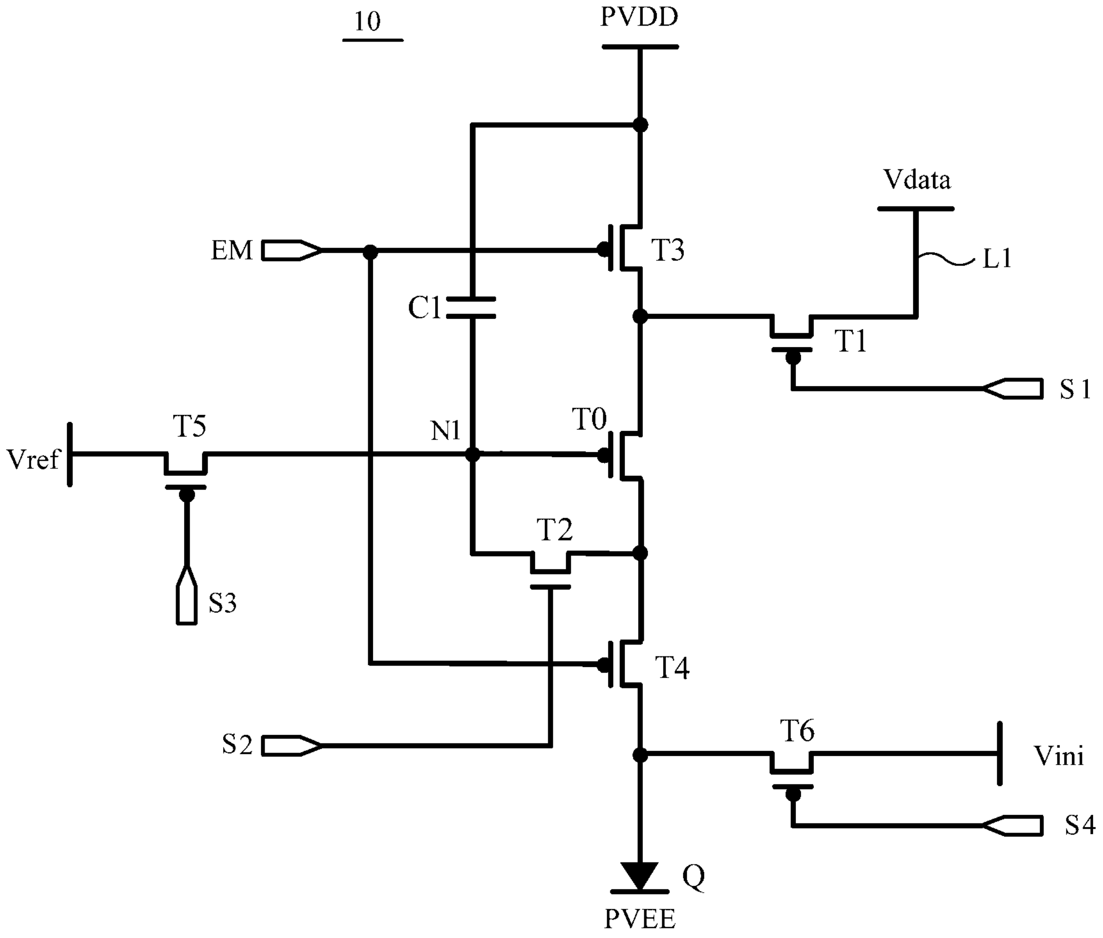
FIG. 2 is a schematic diagram of a circuit structure of a pixel circuit in an exemplary display panel according to various embodiments of the present disclosure.
Figure 3:
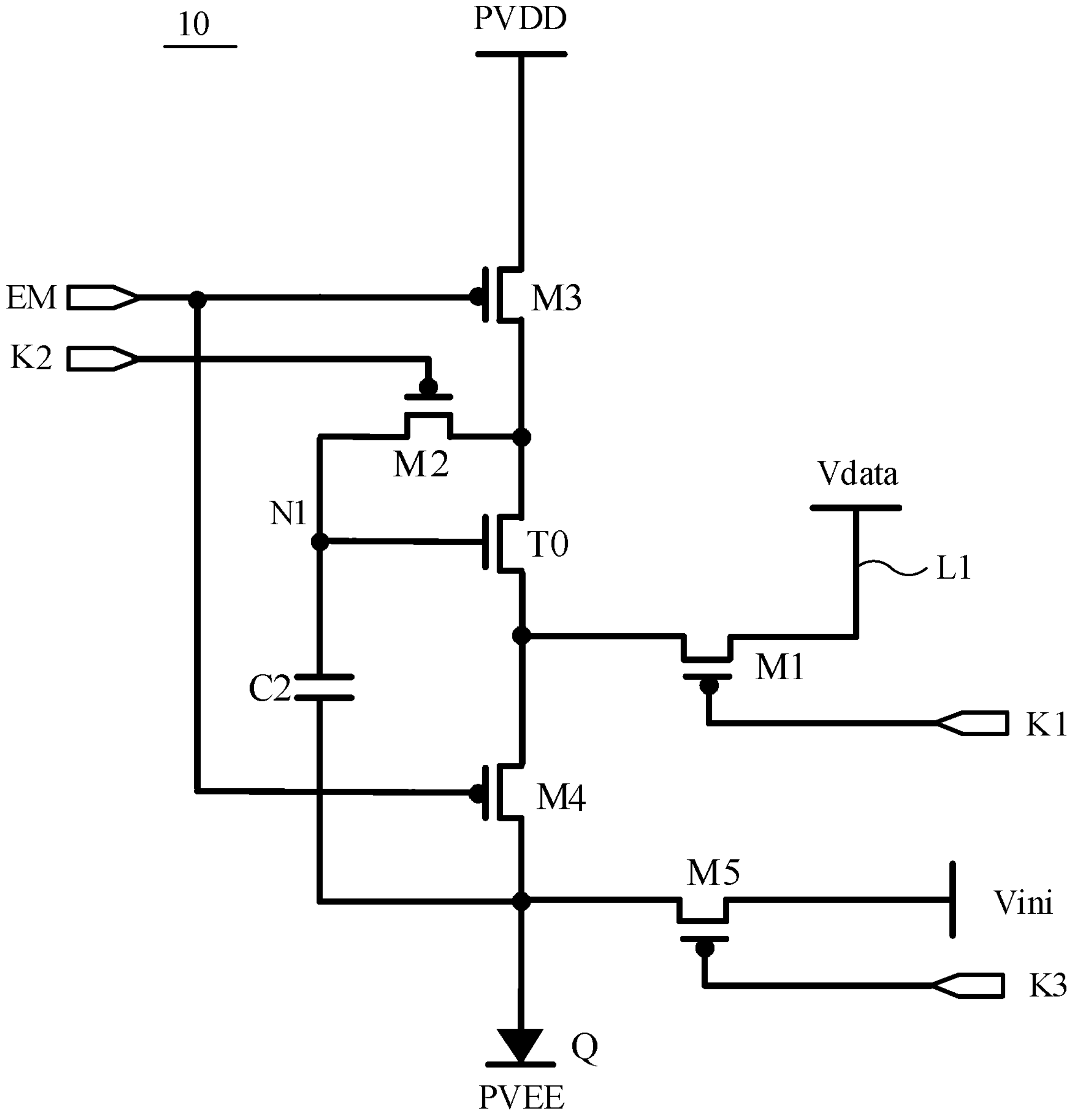
FIG. 3 is a schematic diagram of a circuit structure of a pixel circuit in another exemplary display panel according to various embodiments of the present disclosure.

Referring to FIGS. 2 and 3, FIG. 2 is a schematic diagram of a circuit structure of a pixel circuit in an exemplary display panel according to various embodiments of the present disclosure, and FIG. 3 is a schematic diagram of a circuit structure of a pixel circuit in another exemplary display panel according to various embodiments of the present disclosure.

A display panel includes a pixel circuit 10 and a light-emitting element Q. The pixel circuit 10 is connected to a data signal line L1 and includes a driving transistor T0 to provide a driving current for the light-emitting element Q. The driving transistor T0 in the pixel circuit can be a PMOS-type driving transistor or an NMOS-type driving transistor, and structures of corresponding pixel circuits of the two are different. A pixel circuit corresponding to a PMOS-type driving transistor and a pixel circuit corresponding an NMOS-type driving transistor are introduced separately below.

As shown in FIG. 2, a pixel circuit in which a driving transistor T0 is a PMOS-type driving transistor is described.

A drain of the driving transistor T0 is coupled to a light-emitting element Q, and provides a driving current for the light-emitting element Q after the driving transistor T0 is turned on.

Optionally, as shown in FIG. 2, the pixel circuit 10 further includes a data writing transistor T1. The data writing transistor T1 is connected between a source of the driving transistor T0 and a data signal line L1. A source of the data writing transistor T1 is configured to receive a data signal Vdata. A drain of the data writing transistor T1 is connected to the source of the driving transistor T0, and a gate of the data writing transistor T1 is configured to receive a control signal S1. The control signal S1 received by the data writing transistor T1 is a pulse signal, and an effective pulse of the control signal S1 controls the data writing transistor T1 to be in an on state, to provide the data signal Vdata to the driving transistor T0. An invalid pulse of the control signal S1 controls the data writing transistor T1 to be in an off state. Therefore, under a control of the control signal S1, the data writing transistor T1 selectively provides the data signal Vdata to the driving transistor T0.

Optionally, as shown in FIG. 2, the pixel circuit 10 further includes a compensation transistor T2 for compensating a threshold voltage of the driving transistor T0. A source of the compensation transistor T2 is connected to a gate of the driving transistor T0 to form a first node N1. A drain of the compensating transistor T2 is connected to the drain of the driving transistor T0, and a gate of the compensating transistor T2 is configured to receive a control signal S2. The control signal S2 received by the compensation transistor T2 is a pulse signal, and an effective pulse of the control signal S2 controls the compensation transistor T2 to be in an on state to compensate the threshold voltage of the driving transistor T0, and an invalid pulse of the control signal S2 controls the compensation transistor T2 to be in an off state. Therefore, under a control of the control signal S2, the compensation transistor T2 selectively compensates the threshold voltage of the driving transistor T0.

Optionally, as shown in FIG. 2, the pixel circuit 10 further includes a first transistor T3 and a second transistor T4. The first transistor T3 is connected between a first power signal terminal PVDD and the source of the driving transistor T0. The second transistor T4 is connected between the drain of the driving transistor T0 and the light-emitting element Q, and is configured to control whether the pixel circuit 10 is in a light-emitting stage or a non-light-emitting stage.

A cathode of the light-emitting element Q is connected to a second power signal terminal PVEE.

Gates of the first transistor T3 and the second transistor T4 simultaneously receive a control signal EM. Under a control of the control signal EM, the second transistor T4 is in an on or off state. The control signal EM received by the gate of the second transistor T4 is a pulse signal. In the light-emitting stage, the control signal EM outputs an effective pulse to control the second transistor T4 to be in the on state, and the driving current provided by the driving transistor T0 flows into the light-emitting element Q to make it emit light. In the non-light-emitting stage, the control signal EM outputs an invalid pulse to control the second transistor T4 to be in the off state, and the light-emitting element Q does not emit light.

Optionally, as shown in FIG. 2, the pixel circuit 10 further includes a third transistor T5. A source of the third transistor T5 receives a reset signal Vref. A drain of the third transistor T5 is connected to the gate of the driving transistor T0, and a gate of the third transistor T5 is configured to receive a control signal S3. The control signal S3 received by the third transistor T5 is a pulse signal. An effective pulse of the control signal S3 controls the third transistor T5 to be in an on state, and the reset signal Vref is written into the gate of the driving transistor T0 through the third transistor T5, to reset the gate of the driving transistor T0. An invalid pulse of the control signal S3 controls the third transistor T5 to be in an off state.

Optionally, as shown in FIG. 2, the pixel circuit 10 further includes a fourth transistor T6. A source of the fourth transistor T6 is configured to receive an initialization signal *Vini*. A drain of the fourth transistor T6 is connected to an anode of the light-emitting element Q, and a gate of the fourth transistor T6 is configured to receive a control signal S4. The control signal S4 received by the fourth transistor T6 is a pulse signal. An effective pulse of the control signal S4 controls the fourth transistor T6 to be in an on state, and the initialization signal *Vini* is written into the anode of the light-emitting element Q through the fourth transistor T6, to initialize the light-emitting element Q. An invalid pulse of the control signal S4 controls the fourth transistor T6 to be in an off state.

Optionally, as shown in FIG. 2, the pixel circuit further includes a storage capacitor C1. A first plate of the storage capacitor C1 is connected to the first power signal terminal PVDD, and a second plate of the storage capacitor C1 is connected to the first node N1.

As shown in FIG. 3, a pixel circuit in which a driving transistor T0 is an NMOS-type driving transistor is described.

A source of the driving transistor T0 is coupled to a light-emitting element Q, and provides a driving current for the light-emitting element Q after the driving transistor T0 is turned on.

Optionally, as shown in FIG. 3, the pixel circuit 10 further includes a data writing transistor M1. The data writing transistor M1 is connected between the source of the driving transistor T0 and a data signal line L1. A source of the data writing transistor M1 is configured to receive a data signal Vdata. A drain of the data writing transistor M1 is connected to the source of the driving transistor T0, and a gate of the data writing transistor M1 is configured to receive a control signal K1. The control signal K1 received by the data writing transistor M1 is a pulse signal. An effective pulse of the control signal K1 controls the data writing transistor M1 to be in an on state, to provide the data signal Vdata to the driving transistor T0. An invalid pulse of the control signal K1 controls the data writing transistor M1 to be in an off state. Therefore, under a control of the control signal K1, the data writing transistor M1 selectively provides the data signal Vdata to the driving transistor T0.

Optionally, as shown in FIG. 3, the pixel circuit 10 further includes a compensation transistor M2 for compensating a threshold voltage of the driving transistor T0. A source of the compensation transistor M2 is connected to a gate of the driving transistor T0 to form a first node N1. A drain of the compensation transistor M2 is connected to a drain of the driving transistor T0, and a gate of the compensation transistor M2 is configured to receive a control signal K2. The control signal K2 received by the compensation transistor M2 is a pulse signal, and an effective pulse of the control signal K2 controls the compensation transistor M2 to be in an on state to compensate the threshold voltage of the driving transistor T0. An invalid pulse of the control signal K2 controls the compensation transistor M2 to be in an off state. Therefore, under a control of the control signal K2, the compensation transistor M2 selectively compensates the threshold voltage of the driving transistor T0.

Optionally, as shown in FIG. 3, the pixel circuit 10 further includes a first transistor M3 and a second transistor M4. The first transistor M3 is connected between a first power signal terminal PVDD and the drain of the driving transistor T0. The second transistor M4 is connected between the source of the driving transistor T0 and the light-emitting element Q, and is configured to control whether the pixel circuit 10 is in a light-emitting stage or a non-light-emitting stage.

A cathode of the light-emitting element Q is connected to a second power signal terminal PVEE.

Gates of the first transistor M3 and the second transistor M4 simultaneously receive a control signal EM. Under a control of the control signal EM, the second transistor M4 is in an on state or an off state. The control signal EM received by a gate of the second transistor M4 is a pulse signal. In the light-emitting stage, the control signal EM outputs an effective pulse to control the second transistor M4 to be in the on state, and the driving current provided by the driving transistor T0 flows into the light-emitting element Q to make it emit light. In the non-light-emitting stage, the control signal EM outputs an invalid pulse to control the second transistor M4 to be in the off state, and the light-emitting element Q does not emit light.

Optionally, as shown in FIG. 3, the pixel circuit 10 further includes a third transistor M5. A source of the third transistor M5 is configured to receive an initialization signal *Vini*, and a drain of the third transistor M5 is connected to an anode of the light-emitting element Q. A gate of the third transistor M5 is configured to receive a control signal K3. The control signal K3 received by the third transistor M5 is a pulse signal, and an effective pulse of the control signal K3 controls the third transistor M5 to be in an on state, and the initialization signal Vini is written into the anode of the light-emitting element Q through the third transistor M5 to initialize the light-emitting element Q. An invalid pulse of the control signal K3 controls the third transistor M5 to be in an off state.

Optionally, as shown in FIG. 3, the pixel circuit 10 further includes a storage capacitor C2. A first plate of the storage capacitor C2 is connected to the first node N1, and a second plate of the storage capacitor C2 is connected to the anode of the light-emitting element Q.

Based on the pixel circuits shown in FIGS. 2 and 3, optionally, the pixel circuits include a data writing module. The data writing module can be the transistor T1 in FIG. 2 or the transistor M1 in FIG. 3. The data writing module is connected to the data signal line. In a data writing stage, the data writing module is turned on, and the data signal line writes the data signal Vdata to the gate of the driving transistor T0. In a bias adjustment stage, the data writing module is turned on, and the data signal line writes a bias adjustment signal to the source or drain of the driving transistor T0. That is, in these embodiments, the data writing module can be multiplexed as a bias adjustment module, and the data signal line can be multiplexed as a bias adjustment signal line. By controlling the compensation transistor to be turned on in the data writing stage and turned off in the bias adjustment stage, it is controlled that the gate of the driving transistor T0 receives the data signal in the data writing stage, and the source or drain receives the bias adjustment signal in the bias adjustment stage.

The above method can avoid adding an additional bias adjustment module, and a function of bias adjustment can be realized by multiplexing the data writing module. The structure is simple, which is beneficial to simplify a panel structure and improve a resolution of the display panel.

Figure 4:
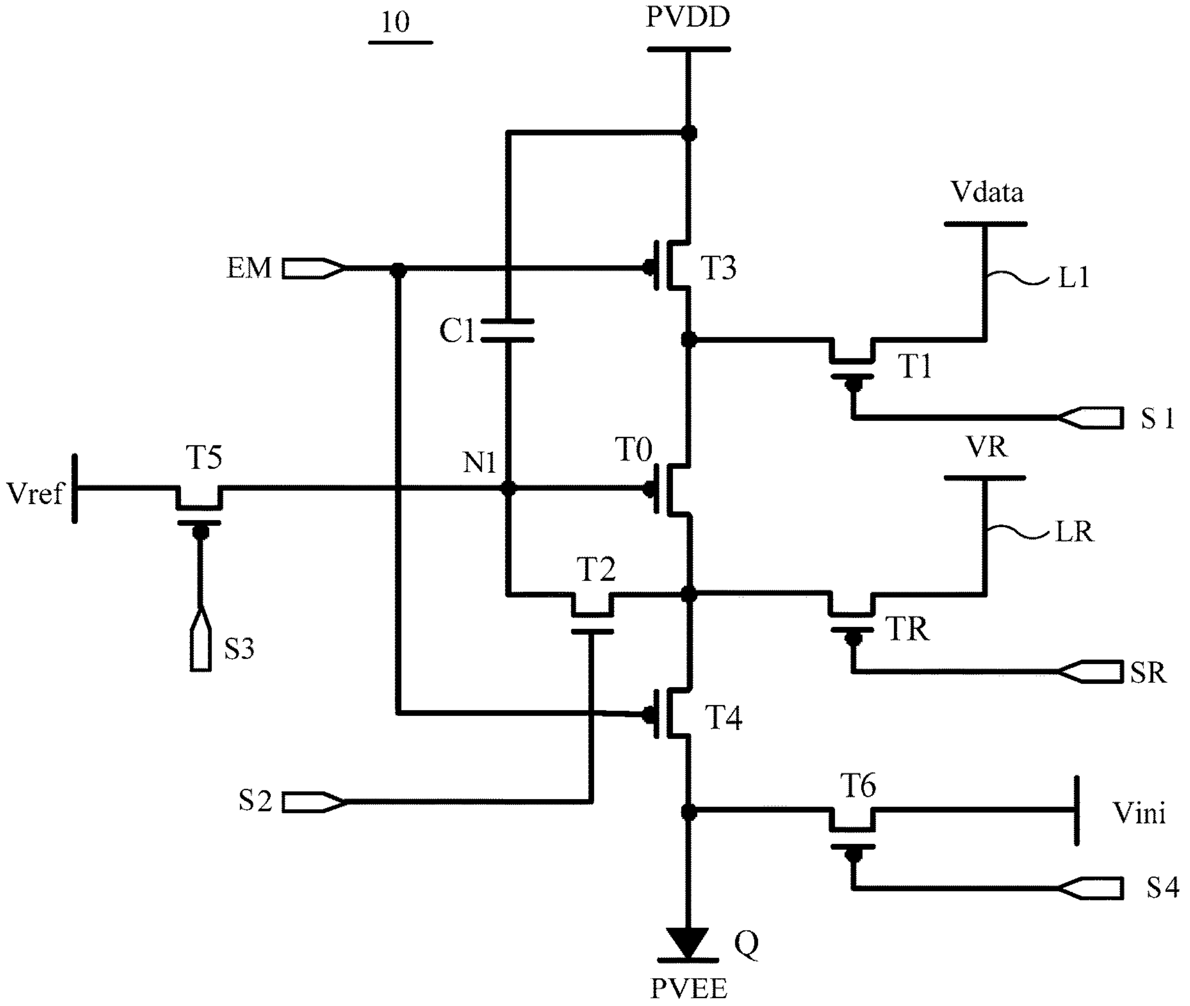
FIG. 4 is a schematic diagram of a circuit structure of a pixel circuit in another exemplary display panel according to various embodiments of the present disclosure.
Figure 5:
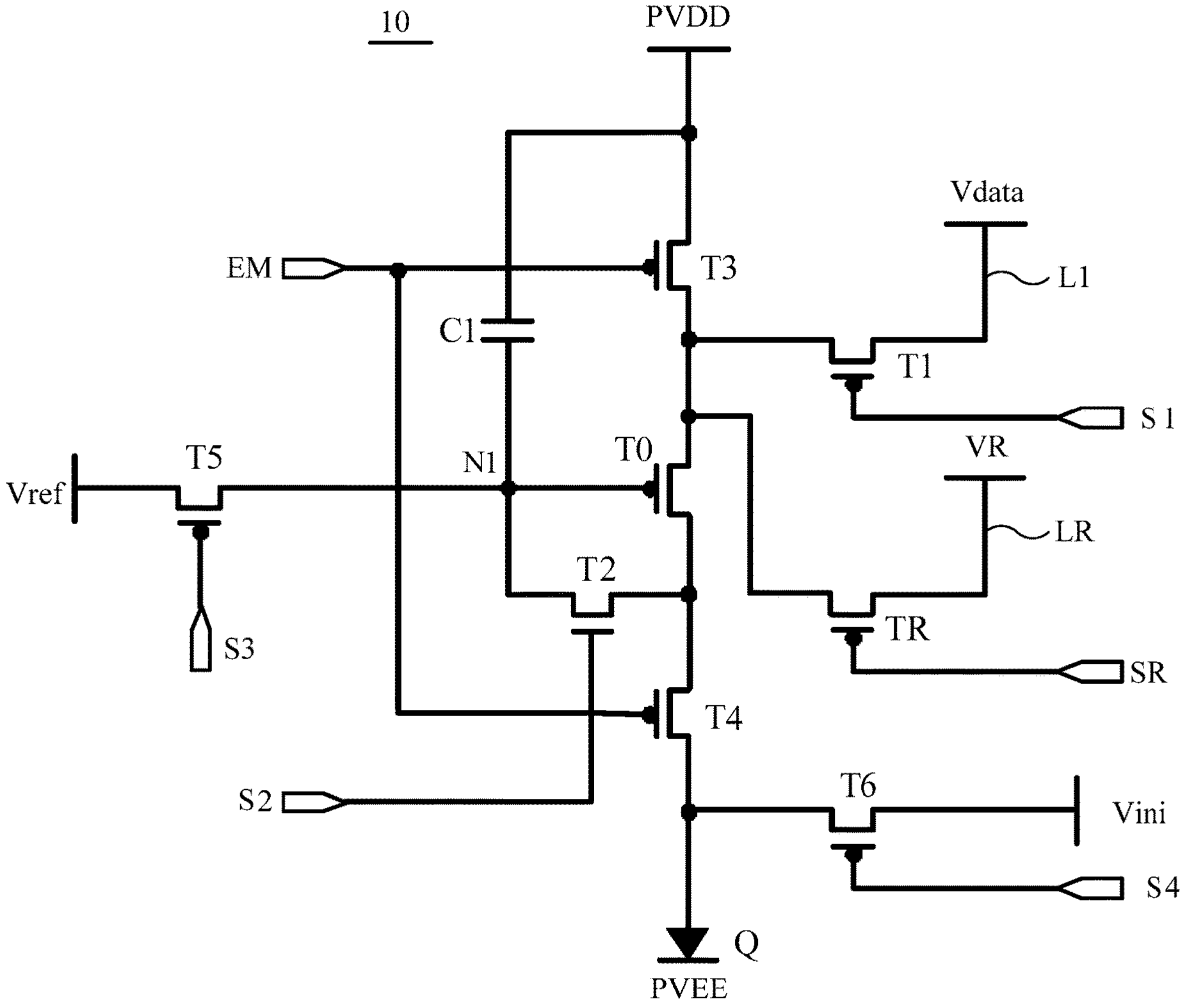
FIG. 5 is a schematic diagram of a circuit structure of a pixel circuit in another exemplary display panel according to various embodiments of the present disclosure.
Figure 6:
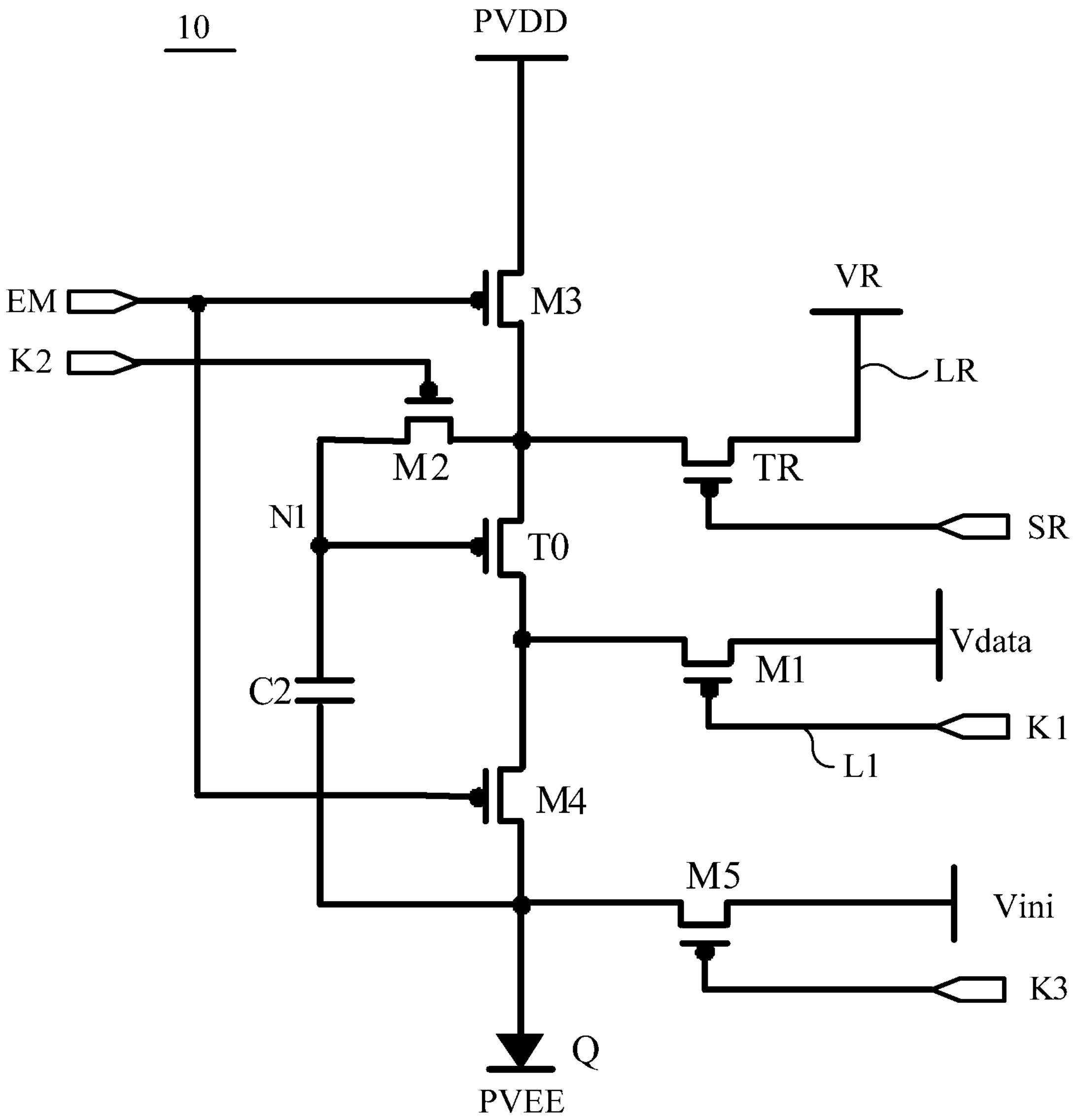
FIG. 6 is a schematic diagram of a circuit structure of a pixel circuit in another exemplary display panel according to various embodiments of the present disclosure.
Figure 7:
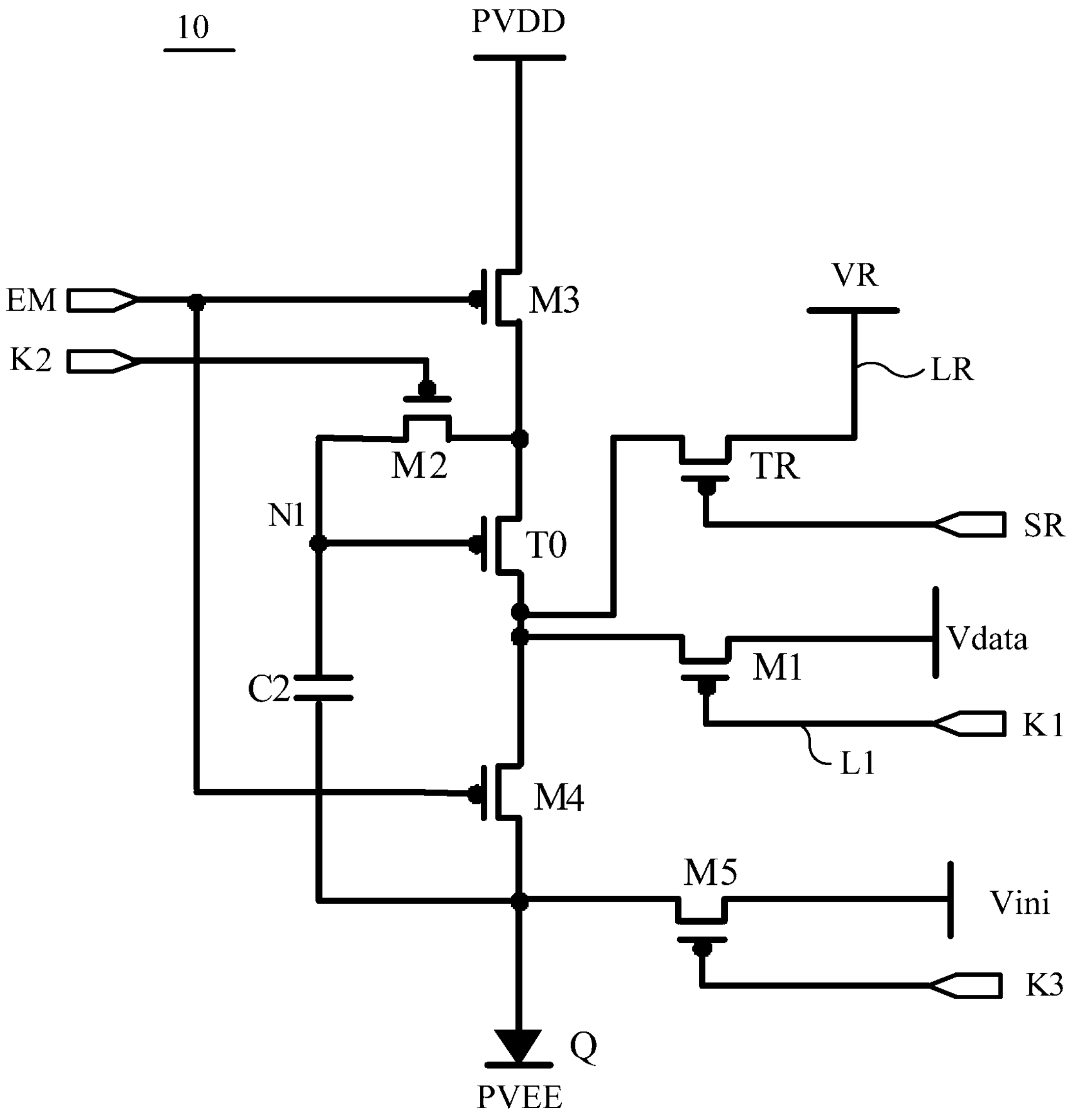
FIG. 7 is a schematic diagram of a circuit structure of a pixel circuit in another exemplary display panel according to various embodiments of the present disclosure.

Referring to FIGS. 4 to 7, FIG. 4 is a schematic diagram of a circuit structure of a pixel circuit in another exemplary display panel according to various embodiments of the present disclosure; FIG. 5 is a schematic diagram of a circuit structure of a pixel circuit in another exemplary display panel according to various embodiments of the present disclosure; FIG. 6 is a schematic diagram of a circuit structure of a pixel circuit in another exemplary display panel according to various embodiments of the present disclosure; and FIG. 7 is a schematic diagram of a circuit structure of a pixel circuit in another exemplary display panel according to various embodiments of the present disclosure. In FIGS. 2, 4, and 5, driving transistors are all PMOS transistors. A difference between FIGS. 4 and 5 and FIG. 2 is that pixel circuits shown in FIGS. 4 and 5 are additionally provided with a bias adjustment module TR. In FIGS. 3, 6, and 7, driving transistors are all NMOS transistors. A difference between FIGS. 6 and 7 and FIG. 3 is that pixel circuits shown in FIGS. 6 and 7 are additionally provided with a bias adjustment module TR. Alternatively, a pixel circuit includes a data writing module and a bias adjustment module TR. The data writing module is connected to a data signal line. The bias adjustment module is connected to a bias adjustment signal line LR and the bias adjustment signal line LR is configured to transmit a bias adjustment signal VR. The bias adjustment module TR is controlled by a control signal SR. In a data writing stage, the data writing module is turned on, and the data signal line writes a data signal to a gate of a driving transistor T0. In a bias adjustment stage, the bias adjustment module TR is turned on, and the bias adjustment signal line LR writes the bias adjustment signal VR to a source or drain of the driving transistor T0.

A difference between FIG. 4 and FIG. 5 is that in the pixel circuit in FIG. 4, a bias adjustment module TR is connected to a drain of a driving transistor, and in the pixel circuit in FIG. 5, a bias adjustment module TR is connected to a source of a driving transistor. A difference between FIG. 6 and FIG. 7 is that in the pixel circuit in FIG. 6, a bias adjustment module TR is connected to a drain of a driving transistor, and in the pixel circuit in FIG. 7, a bias adjustment module TR is connected to a source of a driving transistor.

The above structures, by adding the bias adjustment module TR, are beneficial to realize separate controls of the bias adjustment module TR and the data writing module, and a size of the bias adjustment signal can also be set separately, which is not restricted by the data signal. When display effect requirements of a display panel under both a high data refresh frequency and low data refresh frequency are relatively high, the above-mentioned structures need to be adopted to fully ensure that the display panel has a better display effect under each data refresh frequency.

It should be noted that the aforementioned data writing module may be the aforementioned data writing transistor T1 or M1, and the bias adjustment module TR may be a bias adjustment transistor TR.

Figure 8:
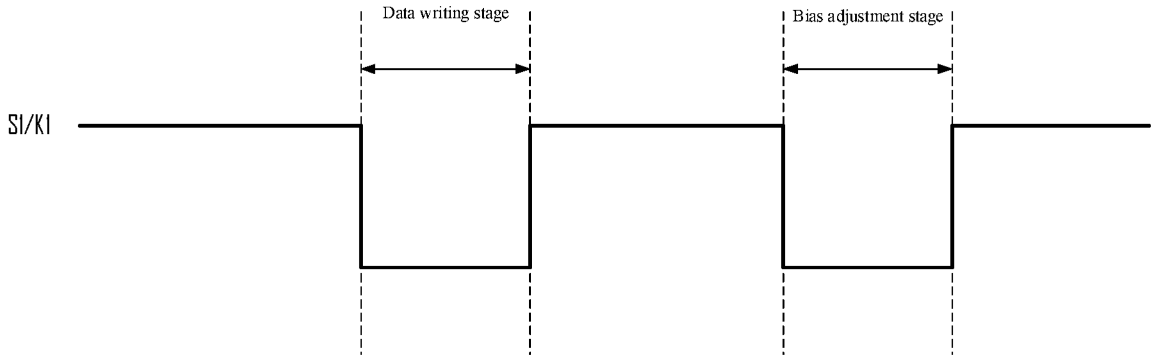
FIG. 8 is a partial timing diagram of a pixel circuit operation according to various embodiments of the present disclosure.

Optionally, referring to FIG. 8, FIG. 8 is a partial timing diagram of a pixel circuit operation according to various embodiments of the present disclosure. The timing diagram shown in FIG. 8 is an optional timing diagram of the pixel circuit shown in FIG. 2 or FIG. 3. For the sake of simplification, a timing diagram in the present disclosure only shows a timing process related to core content of the present disclosure. The timing process of other transistors is omitted here. It should be clear that an operation process of a pixel circuit is realized by coordination of a timing process of each transistor.

As shown in FIG. 8, a working process of the pixel circuit 10 includes a data writing stage and a bias adjustment stage. In the data writing stage, the data signal line L1 writes the data signal Vdata to the gate of the driving transistor T0. In the bias adjustment stage, the data signal line L1 writes the bias adjustment signal to the source or drain of the driving transistor T0.

Alternatively, as shown in FIG. 8, for the pixel circuit based on the PMOS driving transistor, in the data writing stage, the control signal S1 is in the effective pulse stage, the data writing transistor T1 is controlled to be in the on state, and the data signal Vdata is written to the gate of the driving transistor T0 through the data signal line L1. In the bias adjustment stage, the control signal S1 is in the effective pulse stage, the data writing transistor T1 is controlled to be in the on state, and the bias adjustment signal is written to the source of the driving transistor T0 through the data signal line L1.

Similarly, for the pixel circuit based on the NMOS driving transistor, in the data writing stage, the control signal K1 is in the effective pulse stage, the data writing transistor M1 is controlled to be in the on state, and the data signal Vdata is written to the gate of the driving transistor T0 through the data signal line L1. In the bias adjustment stage, the control signal K1 is in the effective pulse stage, the data writing transistor T1 is controlled to be in the on state, and the bias adjustment signal is written to the source of the driving transistor T0 through the data signal line L1.

It should be noted that, in FIG. 8, the data writing transistor is the PMOS transistor as an example. In other embodiments, the data writing transistor may also be the NMOS transistor. At this time, when S1 or K1 jumps to a high potential signal, the data writing transistor is turned on, and when S1 or K1 jumps to a low potential signal, the data writing transistor is turned off.

Figure 9:
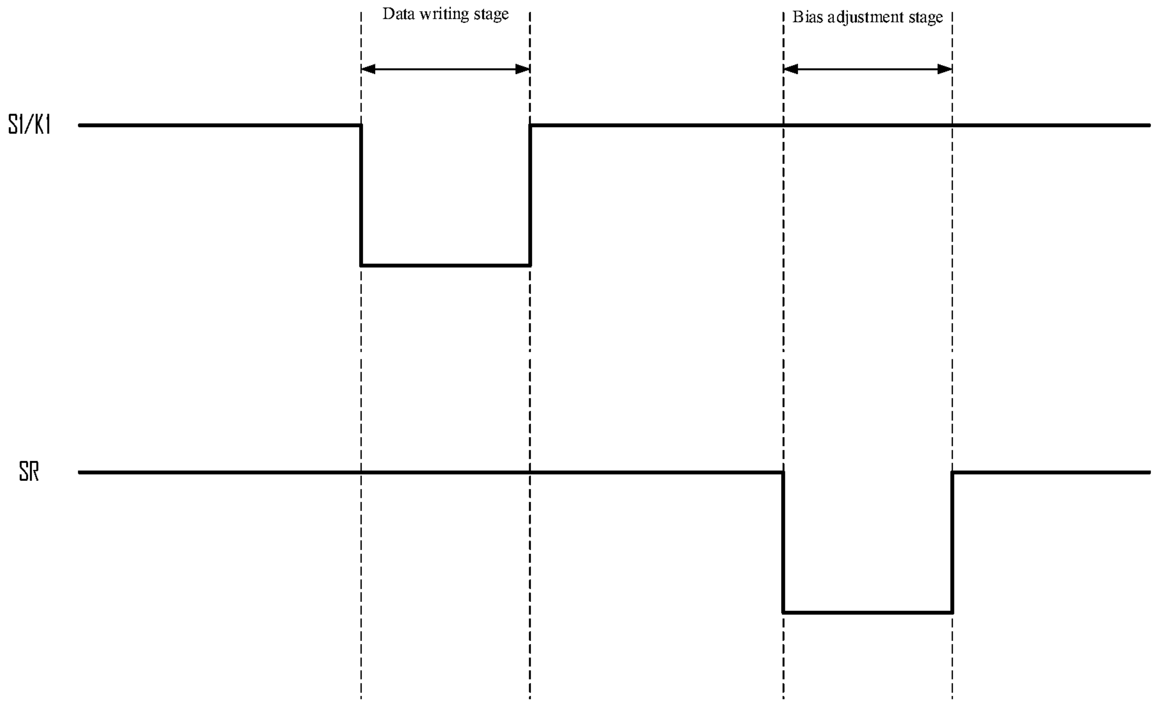
FIG. 9 is a partial timing diagram of another pixel circuit operation according to various embodiments of the present disclosure.

Referring to FIG. 9, FIG. 9 is a partial timing diagram of another pixel circuit operation according to various embodiments of the present disclosure. The timing diagram shown in FIG. 9 is an optional timing diagram of the pixel circuits shown in FIGS. 4 to 7. In the data writing stage, the data writing transistor T1 or M1 is turned on, the bias adjustment module TR is turned off, the compensation transistor is turned on, and the data signal is written into the gate of the driving transistor T0. In the bias adjustment stage, the data writing transistor is turned off, the bias adjustment module TR is turned on, the compensation transistor is turned off, and the bias adjustment signal VR is written into the source or drain of the driving transistor T0. FIG. 9 shows an example in which a transistor included in the bias adjustment module TR is a PMOS transistor. In other embodiments, the transistor included in the bias adjustment module may be an NMOS transistor.

Exemplarily, a frame refresh frequency of the pixel circuit provided in the present disclosure is F1, and a frame includes a data writing frame and a holding frame. In the data writing frame, the data signal line L1 writes the data signal Vdata to the gate of the driving transistor T0. In the holding frame, the data signal line L1 does not write the data signal Vdata to the gate of the driving transistor T0.

Further, a data refresh frequency of the pixel circuit includes a first data refresh frequency F11 and a second data refresh frequency F22, that the frame refresh frequency F1, the first data refresh frequency F11, and the second data refresh frequency F22 satisfy: $F22<F11\leq F1$.

It should be noted that in a concept of the data refresh frequency, data refreshing is calculated based on a minimum period of writing the data signal, and a data refresh period can include one data writing frame and one or more holding frames.

Figure 10:
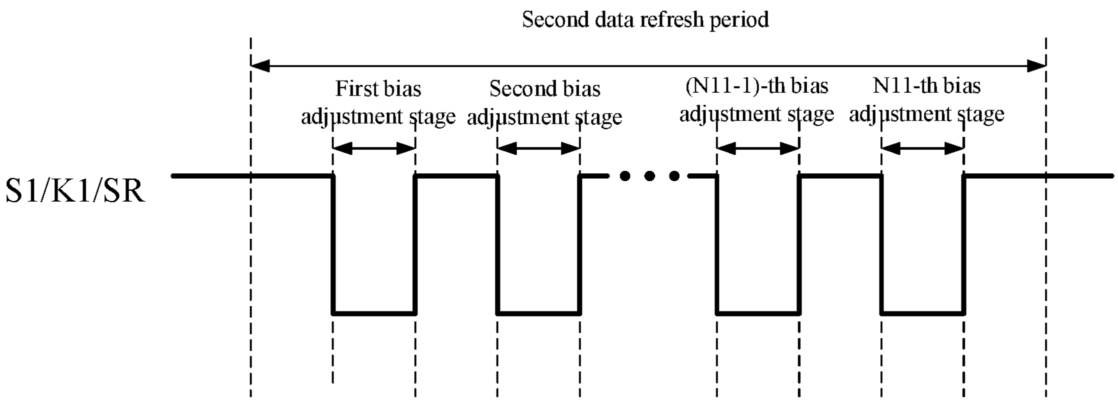
FIG. 10 is a partial timing diagram of another pixel circuit operation according to various embodiments of the present disclosure.

Referring to FIG. 10, FIG. 10 is a partial timing diagram of another pixel circuit operation according to various embodiments of the present disclosure. After the data refresh frequency of the pixel circuit is switched from the first data refresh frequency F11 to the second data refresh frequency F22, one second data refresh period includes N11 bias adjustment stages, and $N11\geq 2$. A first bias adjustment stage of the second data refresh period inputs a bias adjustment signal V11, and an i-th bias adjustment stage inputs a bias adjustment signal Vi, $1\leq i\leq N11$; where, $V11\neq Vi$.

In other words, after the data refresh frequency of the pixel circuit is switched from a high-frequency data refresh frequency to a low-frequency data refresh frequency, the bias adjustment signal V11 in the first bias adjustment stage of the second data refresh period can be different from the bias adjustment signal Vi in the i-th bias adjustment stage. In other words, it is tried to make the bias adjustment signal gradually change to a fixed value in a gradual transition mode, so as when the display panel is switched from the high-frequency data refresh rate driving mode to the low-frequency data refresh rate driving mode, the problem of abnormal brightness is avoided to occur, which means that the screen flickering phenomenon is avoided and the visual experience is improved.

In FIG. 10, according to different input modes of the bias adjustment signal in the pixel circuit, a control signal of an optional bias adjustment module can be any one of the S1, K1, and SR signals in the aforementioned pixel circuits. A specific signal can be selected according to a specific structure of a pixel circuit.

Optionally, in one embodiment of the present disclosure, a data signal written in the data writing frame in the second data refresh period is Vdata, where: $|V11-Vdata|<|Vi-Vdata|$. In one embodiment of the present disclosure, $|V11-Vdata|>|Vi-Vdata|$.

Specifically, in the second data refresh period, $|V11-Vdata|<|Vi-Vdata|$ represents that the bias adjustment signal V11 of the first bias adjustment stage of the second data refresh period is different from the bias adjustment signal Vi of the i-th bias adjustment stage, and a difference between the bias adjustment signal V11 of the first bias adjustment stage and Vdata is smaller than a difference between the bias adjustment signal Vi of the i-th bias adjustment stage and Vdata. In other words, after the data refresh frequency of the pixel circuit is switched from the high-frequency data refresh frequency to the low-frequency data refresh frequency, when the first bias adjustment stage comes, in the first bias adjustment stage, a signal received by the driving transistor is changed from Vdata to a value with a smaller difference from Vdata at first, and then gradually changed to a value with a larger difference from Vdata. The signal is not suddenly changed to a bias adjustment signal with a larger difference from Vdata, but is gradually changed to a fixed value in a smooth transition, so as to avoid the problem of abnormal brightness of the display panel and improve the visual experience. Generally, taking a driving transistor T0 as a PMOS transistor as an example, a maximum value of Vdata is generally between around 4 V and 5 V, and a bias adjustment signal can be set to between around 6.5 V and 7 V, and V11 and/or Vi can be between these two values, for example, greater than around 5 V and less than around 6.5 V, so as to achieve a smooth transition of the bias adjustment signal.

It is illustrated below taking a PMOS driving transistor as an example.

When a driving transistor T0 is a PMOS type driving transistor, a bias adjustment signal received by the driving transistor T0 needs to be greater than a data signal Vdata, that is, the driving transistor T0 needs to switch from a state of receiving the data signal Vdata to receiving the bias adjustment signal with a higher potential. To ensure a smooth transition to this higher-potential bias adjustment signal, there is $|V11-Vdata|<|Vi-Vdata|$.

It is illustrated below taking an NMOS driving transistor as an example.

When a driving transistor T0 is an NMOS type driving transistor, a bias adjustment signal received by the driving transistor T0 needs to be less than a data signal Vdata, that is, the driving transistor T0 needs to switch from a state of receiving the data signal Vdata to receiving the bias adjustment signal with a lower potential. To ensure a smooth transition to this lower-potential bias adjustment signal, there is also $|V11-Vdata|<|Vi-Vdata|$.

Optionally, in another embodiment of the present disclosure, a difference between Vdata and bias adjustment signals inputted in i bias adjustment stages from the first bias adjustment stage to the i-th bias adjustment stage of the second data refresh period increases sequentially.

Specifically, it is further ensured that the bias adjustment signal received by the driving transistor can smoothly transition to a fixed value, so as to prevent a sudden change of the bias adjustment signal during a transition process.

In other words, after the data refresh frequency of the pixel circuit is switched from the high-frequency data refresh frequency to the low-frequency data refresh frequency, when the first bias adjustment stage comes, in the first bias adjustment stage, the signal received by the driving transistor is not directly suddenly changed to a bias adjustment signal with a maximum value, but through multiple bias adjustment stages, bias adjustment signals with increasing difference from Vdata are gradually inputted in multiple stages, and are gradually changed to a fixed value, so as to avoid the problem of abnormal brightness of the display panel and improve the visual experience.

Exemplarily, assuming that there are three bias adjustment stages in the second data refresh period, a difference between the bias adjustment signal inputted in the first bias adjustment stage and Vdata is smaller than a difference between the bias adjustment signal inputted in the second bias adjustment stage and Vdata, and is smaller than a difference between the bias adjustment signal inputted in the third bias adjustment stage and Vdata.

Optionally, in another embodiment of the present disclosure, when the driving transistor is a PMOS transistor, $V11<Vi$; or, when the driving transistor is an NMOS transistor, $V11>Vi$. In one embodiment of the present disclosure, when the driving transistor is a PMOS transistor, $V11>Vi$; or, when the driving transistor is an NMOS transistor, $V11<Vi$.

Specifically, based on characteristics of a PMOS-type transistor, it can be known that when the PMOS-type transistor works in a saturated state, a gate potential is low, and source and drain potentials are high. However, when the pixel circuit in the display panel is in the light-emitting stage, the driving transistor is working in a non-saturated state. For a PMOS-type driving transistor, a situation can be caused that a gate potential of the PMOS-type driving transistor is higher than a drain potential when the PMOS-type driving transistor is turned on. Maintaining this situation for a long time leads to ion polarization inside the driving transistor, which in turn forms a built-in electric field inside the driving transistor, causing a threshold voltage of the driving transistor to continuously shift.

Based on this, in the present disclosure, to prevent this situation from happening, the drain potential of the PMOS driving transistor is raised by the bias adjustment signal during the bias adjustment stage. Therefore, the bias adjustment signal needs to be a high-level signal. At a same time, in the first bias adjustment stage, the bias adjustment signal can be smaller, and the bias adjustment signal can be gradually changed to a fixed high-level signal in a smooth transition through multiple bias adjustment stages, thereby avoiding the problem of abnormal brightness to occur when the display panel is switched from the high-frequency data refresh rate driving mode to the low-frequency data refresh rate driving mode, which means that the screen flickering phenomenon is avoided and the visual experience is improved.

Similarly, based on characteristics of an NMOS transistor, when the NMOS transistor works in a saturated state, a gate potential is high, and source and drain potentials are low. However, when the pixel circuit in the display panel is in the light-emitting stage, the driving transistor is working in a non-saturated state. For an NMOS driving transistor, a situation can be caused that a gate potential of the NMOS driving transistor is lower than a drain potential when the NMOS driving transistor is turned on. Maintaining this situation for a long time leads to ion polarization inside the driving transistor, which in turn forms a built-in electric field inside the driving transistor, causing a threshold voltage of the driving transistor to continuously shift.

Based on this, in the present disclosure, to prevent this situation from happening, the drain potential of the NMOS driving transistor is pulled down by the bias adjustment signal during the bias adjustment stage. Therefore, the bias adjustment signal needs to be a low-level signal. At a same time, in the first bias adjustment stage, the bias adjustment signal can be larger, and the bias adjustment signal can be gradually changed to a fixed low-level signal in a smooth transition through multiple bias adjustment stages, thereby avoiding the problem of abnormal brightness to occur when the display panel is switched from the high-frequency data refresh rate driving mode to the low-frequency data refresh rate driving mode, which means that the screen flickering phenomenon is avoided and the visual experience is improved.

Optionally, in another embodiment of the present disclosure, the driving transistor is a PMOS type transistor, and bias adjustment signals inputted in i bias adjustment stages of the second data refresh period from the first bias adjustment stage to the i-th bias adjustment stage increase sequentially.

The driving transistor is an NMOS transistor, and bias adjustment signals inputted in i bias adjustment stages of the second data refresh period from the first bias adjustment stage to the i-th bias adjustment stage decrease sequentially.

Specifically, it is further ensured that the bias adjustment signal received by the driving transistor can smoothly transition to a fixed value, so as to prevent a sudden change of the bias adjustment signal during a transition process.

Based on the PMOS type driving transistor, in a process of continuously increasing the bias adjustment signal, after the data refresh frequency of the pixel circuit is switched from the high-frequency data refresh frequency to the low-frequency data refresh frequency, when the first bias adjustment stage comes, in the first bias adjustment stage, the signal received by the driving transistor is not directly suddenly changed to a bias adjustment signal with a maximum value, but through multiple bias adjustment stages, sequentially increasing bias adjustment signals are inputted multi-stage gradually to a fixed high-level signal in a smooth transition, so as to avoid the problem of abnormal brightness of the display panel and improve the visual experience.

Based on the NMOS driving transistor, in a process of continuously decreasing the bias adjustment signal, after the data refresh frequency of the pixel circuit is switched from the high-frequency data refresh frequency to the low-frequency data refresh frequency, when the first bias adjustment stage comes, in the first bias adjustment stage, the signal received by the driving transistor is not directly suddenly changed to a bias adjustment signal with a minimum value, but through multiple bias adjustment stages, sequentially decreasing bias adjustment signals are inputted multi-stage gradually to a fixed low-level signal in a smooth transition, so as to avoid the problem of abnormal brightness of the display panel and improve the visual experience.

Optionally, in another embodiment of the present disclosure, bias adjustment signals inputted in (N−i+1) bias adjustment stages from the i-th bias adjustment stage to an N-th bias adjustment stage of the second data refresh period are equal, which is a preset bias adjustment signal V0.

Specifically, in the second data refresh period, after from the first bias adjustment stage to the i-th bias adjustment stage, the bias adjustment signals with smooth transition have changed to a fixed value of the bias adjustment signal, that is, the preset bias adjustment signal V0.

In this smooth transition process, it has been fully ensured that the signal received by the driving transistor is not suddenly changed, thereby avoiding the problem of abnormal brightness of the display panel and improving the visual experience.

Then, the bias adjustment signals inputted in the (N−i+1) bias adjustment stages from the i-th bias adjustment stage to the N-th bias adjustment stage of the second data refresh period are equal, which is the preset bias adjustment signal V0.

Optionally, in another embodiment of the present disclosure, bias adjustment signals inputted in i bias adjustment stages from the first bias adjustment stage to the i-th bias adjustment stage of the second data refresh period increase or decrease sequentially in an arithmetic manner.

Alternatively, to further ensure that the bias adjustment signal received by the driving transistor can smoothly transition to a fixed value, and prevent sudden changes in the bias adjustment signal during a transition process, in the present disclosure, by optimizing a smooth transition of the bias adjustment signal, an arithmetic increase or an arithmetic decrease is configured to fully ensure that the signal received by the driving transistor is smoothly transitioned, ensuring that the signal received by the driving transistor is not suddenly changed, thereby avoiding the problem of abnormal brightness of the display panel, and improving the visual experience.

Optionally, in another embodiment of the present disclosure, in the i bias adjustment stages from the first bias adjustment stage to the i-th bias adjustment stage of the second data refresh period, a difference between bias adjustment signals inputted in adjacent bias adjustment stages gradually increases.

Specifically, from the first bias adjustment stage to the i-th bias adjustment stage of the second data refresh period, a difference between bias adjustment signals inputted from adjacent bias adjustment stages is gradually increased. Under a condition of ensuring that the signal received by the driving transistor is not suddenly changed, the bias adjustment signal received by the driving transistor is made to reach the preset bias adjustment signal V0 at a faster speed.

Exemplarily, when a difference between the data signal Vdata and the preset bias adjustment signal V0 is large, a difference between the bias adjustment signal inputted in the first bias adjustment stage and the bias adjustment signal inputted in a second bias adjustment stage can be made to be relatively small first, and then a difference between bias adjustment signals inputted in adjacent bias adjustment stages is gradually increased.

In other words, in the entire bias adjustment stage, the driving transistor is given an adaptation time in an early stage to avoid a large difference between bias adjustment signals inputted in adjacent bias adjustment stages at the beginning, which can result in a state of the driving transistor to be changed suddenly. In a mid-to-late stage, the difference between bias adjustment signals inputted in adjacent bias adjustment stages can be gradually increased, so that the bias adjustment signal received by the driving transistor can be made to reach the preset bias adjustment signal V0 at a faster speed.

Optionally, in another embodiment of the present disclosure, in i bias adjustment stages from the first bias adjustment stage to the i-th bias adjustment stage of the second data refresh period, a difference between bias adjustment signals inputted in adjacent bias adjustment stages gradually decreases.

Specifically, when a difference between the data signal Vdata and the preset bias adjustment signal V0 is small, a difference between the bias adjustment signal inputted in the first bias adjustment stage and the bias adjustment signal inputted in a second bias adjustment stage can be made to be slightly larger, and then a difference between bias adjustment signals inputted in adjacent bias adjustment stages is gradually decreased.

Since the difference between the data signal Vdata and the preset bias adjustment signal V0 is small, and influence on the driving transistor is small, the above-mentioned setting does not cause too much influence on the driving transistor.

Optionally, in another embodiment of the present disclosure, when the driving transistor is a PMOS transistor, a potential of the bias adjustment signal is higher than the data signal Vdata written in the data writing frame in the second data refresh period.

When the driving transistor is an NMOS transistor, a potential of the bias adjustment signal is lower than the data signal Vdata written in the data writing frame in the second data refresh period.

Specifically, based on characteristics of a PMOS-type transistor, it can be known that when the PMOS-type transistor works in a saturated state, a gate potential is low, and source and drain potentials are high. However, when the pixel circuit in the display panel is in the light-emitting stage, the driving transistor is working in a non-saturated state. For a PMOS-type driving transistor, a situation is caused that a gate potential of the PMOS-type driving transistor is higher than a drain potential when the PMOS-type driving transistor is turned on. Maintaining this situation for a long time leads to ion polarization inside the driving transistor, which in turn forms a built-in electric field inside the driving transistor, resulting in a continuous increase of a threshold voltage of the driving transistor.

Based on this, in the present disclosure, to prevent this situation from happening, a potential of the bias adjustment signal is higher than the data signal Vdata written in the data writing frame in the second data refresh period, that is, the drain potential of the PMOS driving transistor is raised by the bias adjustment signal during the bias adjustment stage, to improve a potential difference between the gate potential and the drain potential of the PMOS driving transistor, thereby weakening a degree of ion polarization inside the driving transistor and lowering the threshold voltage of the driving transistor, to ensure that the Id-Vg curve does not shift as much as possible. Therefore, when the display panel is switched from the high-frequency data refresh rate driving mode to the low-frequency data refresh rate driving mode, the problem of abnormal brightness does not occur, which means the screen flickering phenomenon does not occur, and the visual experience is improved.

Similarly, based on characteristics of an NMOS transistor, when the NMOS transistor works in a saturated state, a gate potential is high, and source and drain potentials are low. However, when the pixel circuit in the display panel is in the light-emitting stage, the driving transistor is working in a non-saturated state. For an NMOS driving transistor, a situation is caused that a gate potential of the NMOS driving transistor is lower than a drain potential when the NMOS driving transistor is turned on. Maintaining this situation for a long time leads to ion polarization inside the driving transistor, which in turn forms a built-in electric field inside the driving transistor, resulting in a continuous increase of a threshold voltage of the driving transistor.

Based on this, in the present disclosure, to prevent this situation from happening, a potential of the bias adjustment signal is lower than the data signal Vdata written in the data writing frame in the second data refresh period, that is, the drain potential of the NMOS driving transistor is pulled down by the bias adjustment signal in the bias adjustment stage, to improve a potential difference between the gate potential and the drain potential of the NMOS driving transistor, thereby weakening a degree of ion polarization inside the driving transistor and lowering the threshold voltage of the driving transistor, to ensure that the Id-Vg curve does not shift as much as possible. Therefore, when the display panel is switched from the high-frequency data refresh rate driving mode to the low-frequency data refresh rate driving mode, the problem of abnormal brightness does not occur, which means that the screen flickering phenomenon does not occur, and the visual experience is improved.

Figure 11:
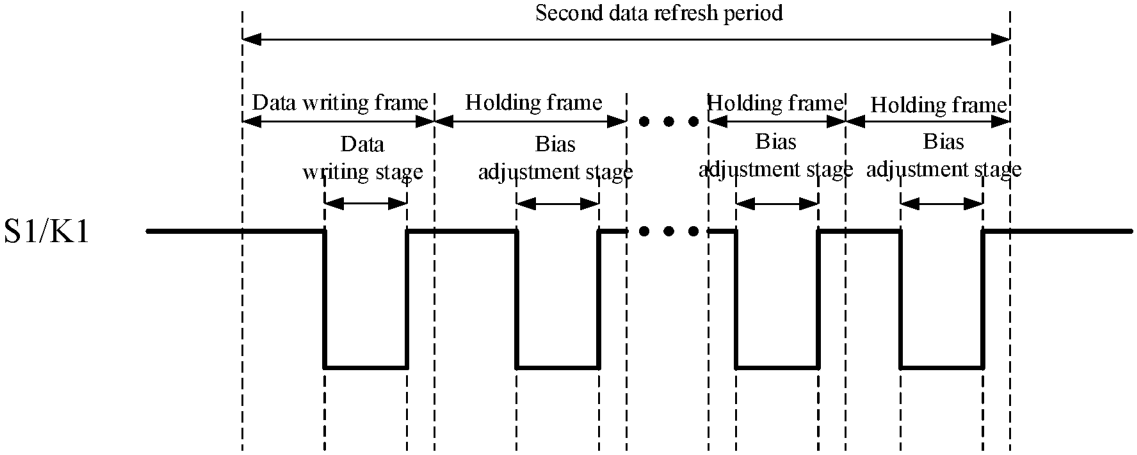
FIG. 11 is a partial timing diagram of another pixel circuit operation according to various embodiments of the present disclosure.
Figure 12:
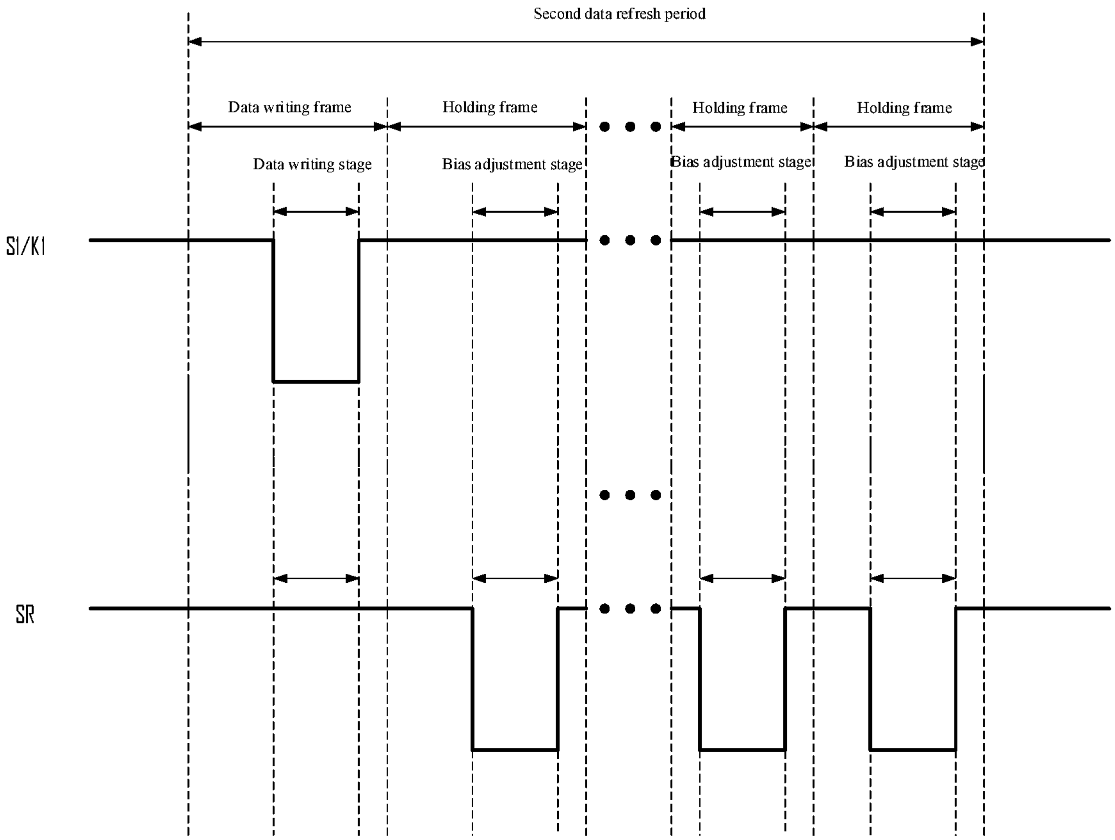
FIG. 12 is a partial timing diagram of another pixel circuit operation according to various embodiments of the present disclosure.
Figure 13:
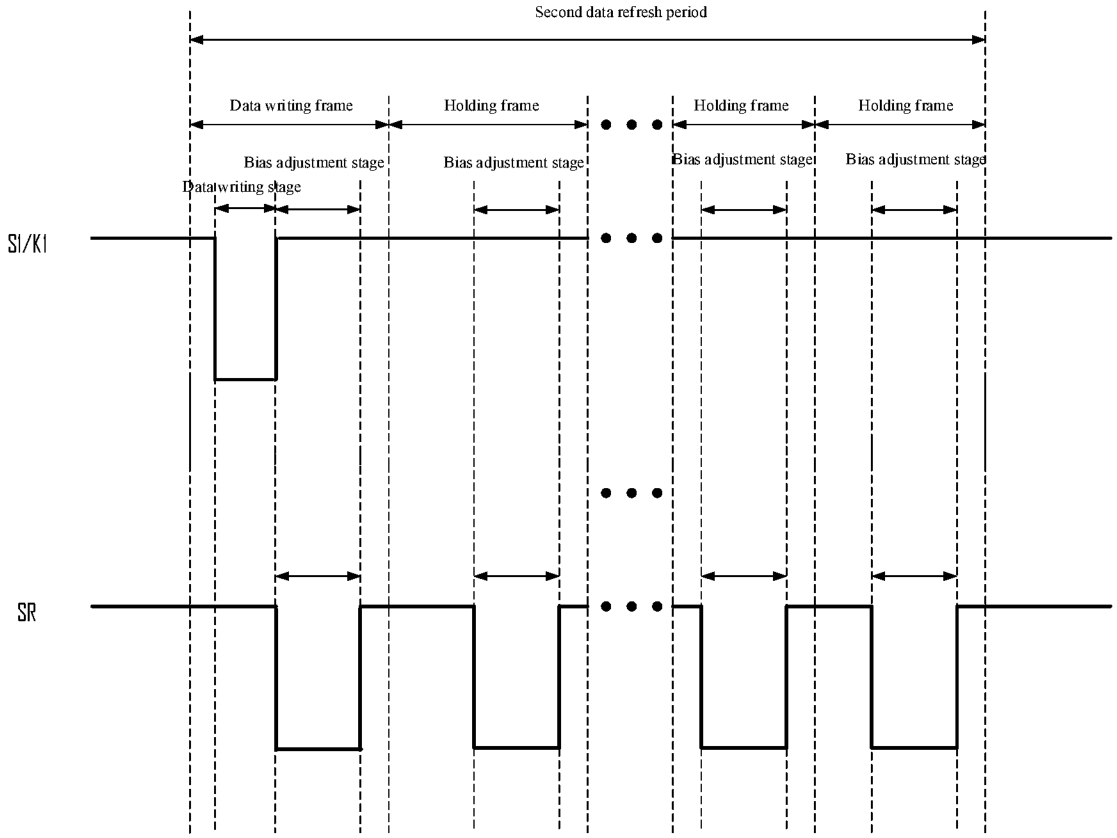
FIG. 13 is a partial timing diagram of another pixel circuit operation according to various embodiments of the present disclosure.

Optionally, in another embodiment of the present disclosure, referring to FIGS. 11 to 13, FIG. 11 is a partial timing diagram of another pixel circuit operation according to various embodiments of the present disclosure, FIG. 12 is a partial timing diagram of another pixel circuit operation according to various embodiments of the present disclosure, and FIG. 13 is a partial timing diagram of another pixel circuit operation according to various embodiments of the present disclosure. FIG. 11 is a partial timing diagram corresponding to the pixel circuit shown in FIG. 2 or FIG. 3, and FIG. 12 and FIG. 13 are partial timing diagrams corresponding to the pixel circuit shown in FIGS. 4 to 7.

When the pixel circuit works at the second data refresh frequency F22, one second data refresh period includes one data writing frame and r holding frames, and r 1.

The holding frames include bias adjustment stages.

Alternatively, in the data writing frame, the data signal line L1 provides the data signal Vdata to the gate of the driving transistor T0, while the data signal line L1 does not provide the data signal Vdata to the gate of the driving transistor T0 in the holding frames. Therefore, in the present disclosure, the bias adjustment stages are set in the holding frames. On one hand, a long duration of the data writing frame can be avoided. On another hand, as shown in FIG. 11, because the bias adjustment signal needs to be transmitted through the data signal line L1, and the data signal Vdata needs to be transmitted through the data signal line L1 in the data writing frame, setting the bias adjustment stages in the data writing frame can cause the data signal Vdata and the bias adjustment signal to be incompatible, but the data signal line L1 can be switched to transmit the bias adjustment signal in the holding frames. In other embodiments of the present disclosure, especially corresponding to the pixel circuits shown in FIGS. 4 to 7, if the data writing frame can also be provided with a bias adjustment stage, the data writing frame may also include the bias adjustment stage, that is, as shown in FIG. 13, in the data writing frame, the SR signal can also control the bias adjustment module to turn on.

Further, for the display panel adopting the low-frequency data refresh rate driving mode, a number of holding frames is relatively large, so modes of transmitting the bias adjustment signal can be set more flexibly.

Figure 14:
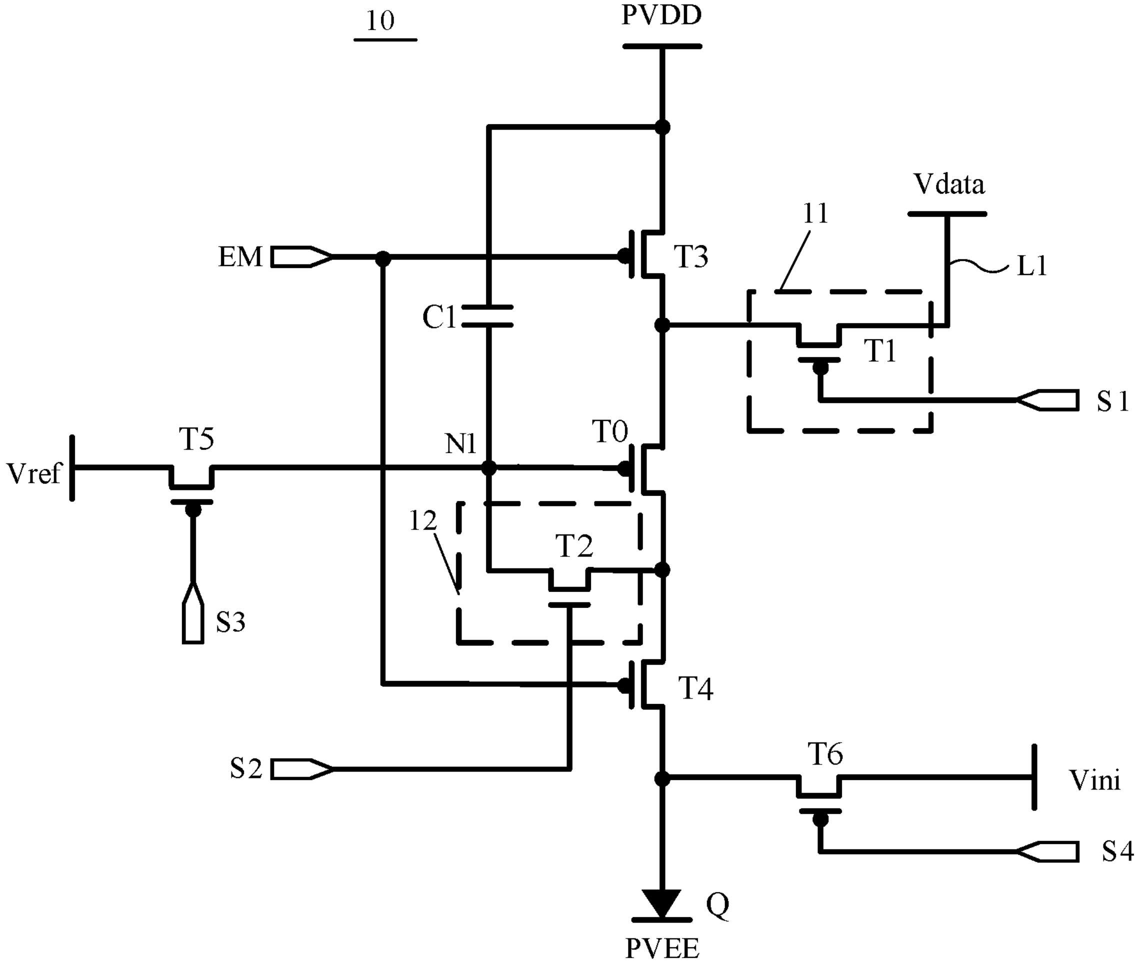
FIG. 14 is a schematic diagram of a circuit structure of a pixel circuit in another exemplary display panel according to various embodiments of the present disclosure.
Figure 15:
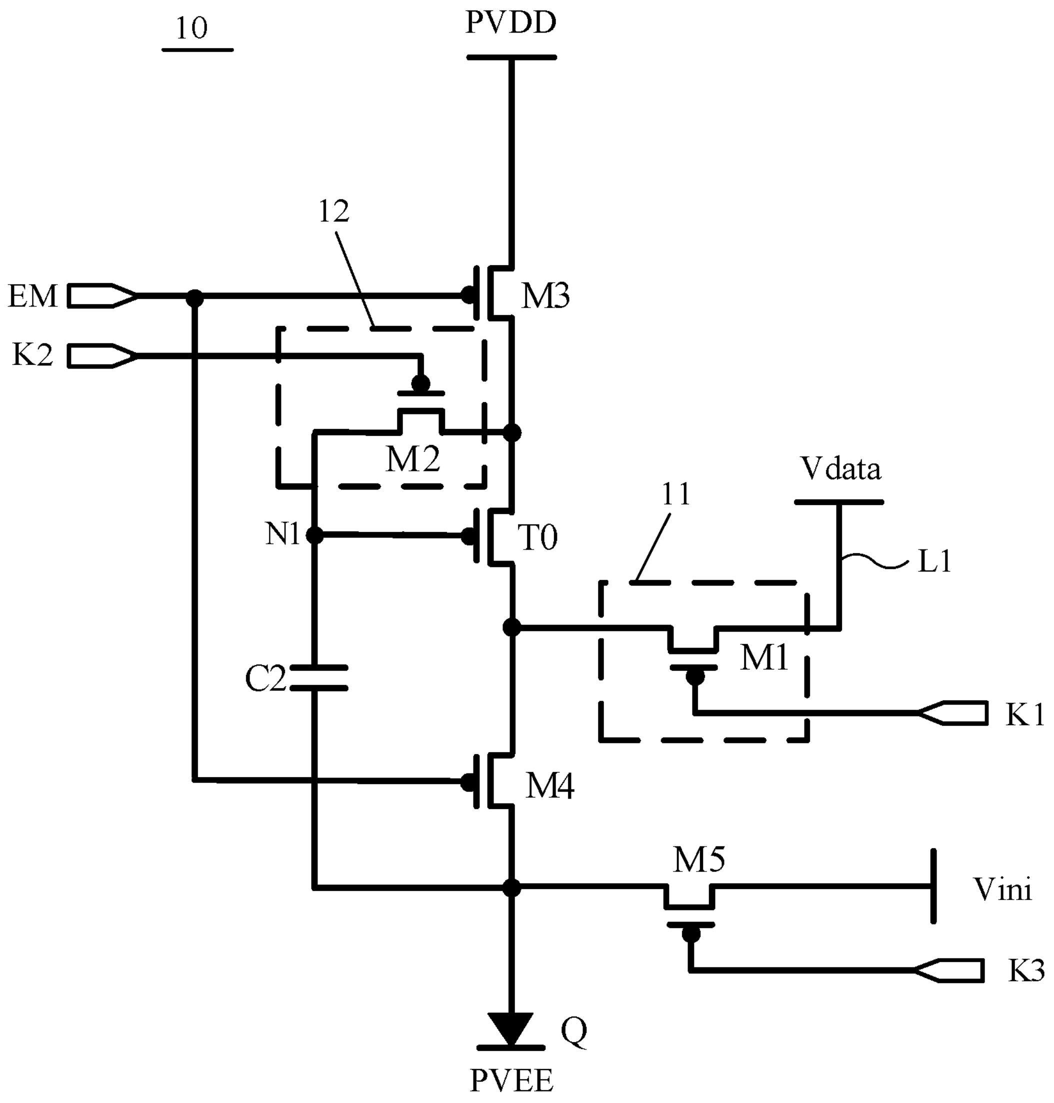
FIG. 15 is a schematic diagram of a circuit structure of a pixel circuit in another exemplary display panel according to various embodiments of the present disclosure.

Optionally, in another embodiment of the present disclosure, referring to FIGS. 14 and 15, FIG. 14 is a schematic diagram of a circuit structure of a pixel circuit in another exemplary display panel according to various embodiments of the present disclosure, and FIG. 15 is a schematic diagram of a circuit structure of a pixel circuit in another exemplary display panel according to various embodiments of the present disclosure.

A pixel circuit 10 includes a data writing module 11 and a compensation module 12. The data writing module 11 is connected between a data signal line L1 and a source of a driving transistor T0, and the compensation module 12 is connected between a gate and a drain of the driving transistor T0.

In a data writing frame, the data writing module 11 and the compensation module 12 are turned on, and the data signal line L1 writes a data signal Vdata into the gate of the driving transistor T0.

In holding frames, the data writing module 11 is turned on, the compensation module 12 is turned off, and the data signal line L1 writes a bias adjustment signal into a source or drain of the driving transistor T0.

Figure 16:
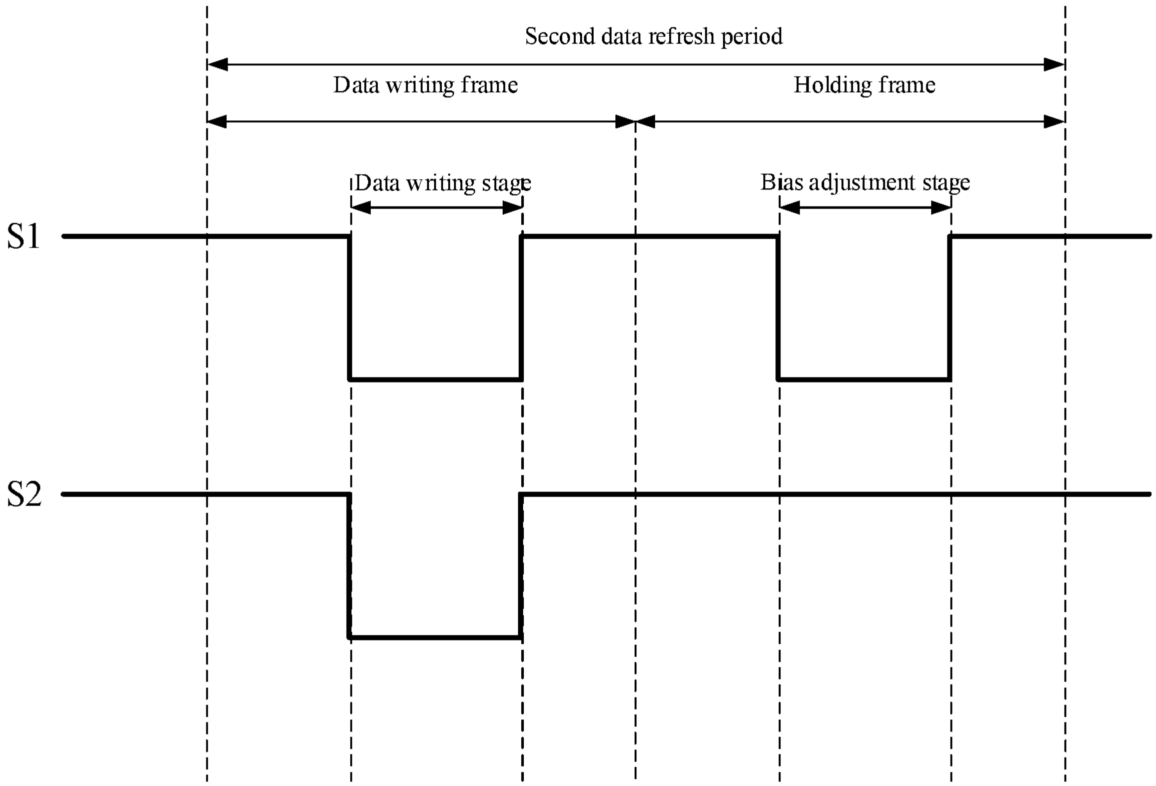
FIG. 16 is a partial timing diagram of another pixel circuit operation according to various embodiments of the present disclosure.

Alternatively, for a pixel circuit based on a PMOS driving transistor as shown in FIG. 14, referring to FIG. 16, FIG. 16 is a partial timing diagram of another pixel circuit operation according to various embodiments of the present disclosure. In the data writing frame, a control signal S1 is in an effective pulse stage to control a data writing transistor T1 to be in an on state, a control signal S2 is in an effective pulse stage to control a compensation transistor T2 to be in an on state, and the data signal Vdata is written to the gate of the driving transistor T0 through the data signal line L1. In the holding frames, the control signal S1 is in the effective pulse stage to control the data writing transistor T1 to be in the on state, the control signal S2 is in an invalid pulse stage to control the compensation transistor to be in an off state, and the bias adjustment signal is written into the source of the driving transistor T0 through the data signal line L1 for adjusting a bias state of the driving transistor T0.

Figure 17:
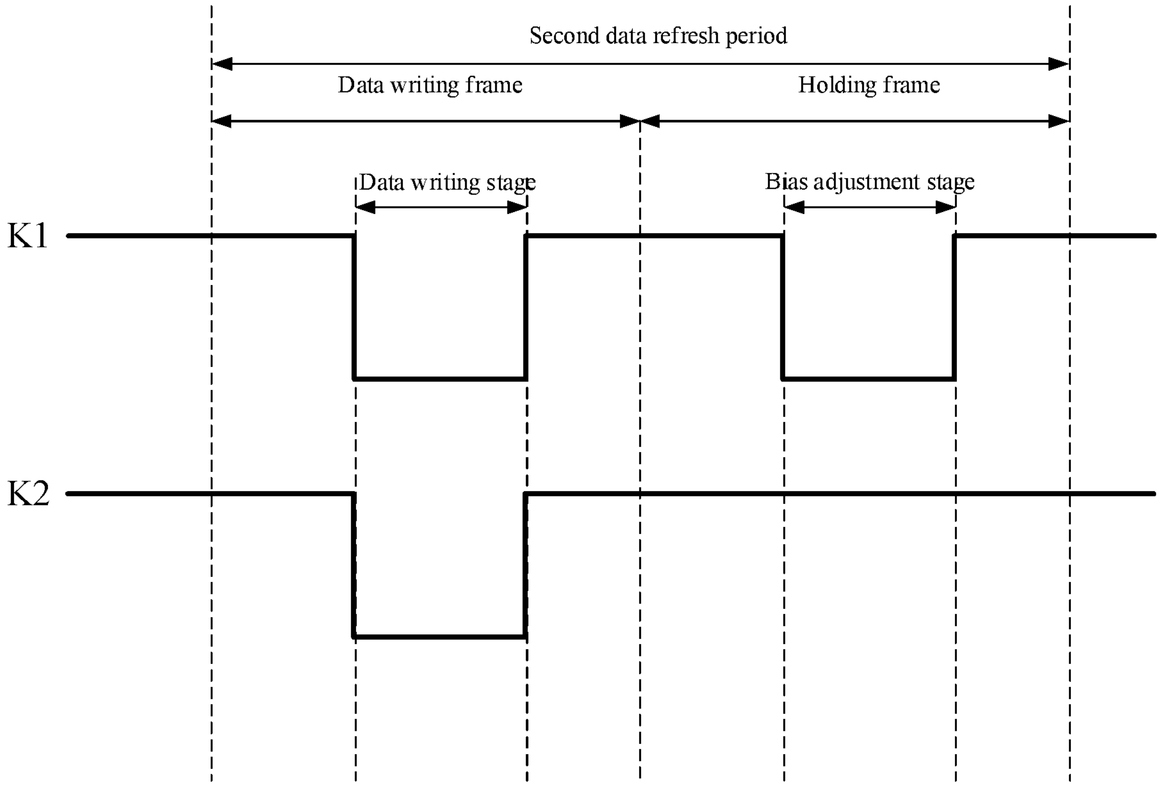
FIG. 17 is a partial timing diagram of another pixel circuit operation according to various embodiments of the present disclosure.

Similarly, for a pixel circuit based on an NMOS driving transistor as shown in FIG. 15, referring to FIG. 17, FIG. 17 is a partial timing diagram of another pixel circuit operation according to various embodiments of the present disclosure. In the data writing frame, a control signal K1 is in an effective pulse stage to control a data writing transistor M1 to be in an on state, a control signal K2 is in an effective pulse stage to control a compensation transistor M2 to be in an on state, and the data signal Vdata is written to the gate of the driving transistor T0 through the data signal line L1. In the holding frames, the control signal K1 is in the effective pulse stage to control a data writing transistor T1 to be in an on state, the control signal K2 is in an invalid pulse stage to control the compensation transistor M2 to be in an off state, and the bias adjustment signal is written to the source of the driving transistor T0 through the data signal line L1, to adjust the bias state of the driving transistor T0.

Optionally, in another embodiment of the present disclosure, in the second data refresh period, the first bias adjustment stage is located in a first holding frame, and the i-th bias adjustment stage is located in an i-th holding frame.

Alternatively, in a case of multiple holding frames, one holding frame includes one bias adjustment stage, then the first bias adjustment stage is located in the first holding frame, which can ensure that after an end of the data writing frame, bias adjustment of the driving transistor can be realized in the first holding frame.

Or, in the second data refresh period, including multiple bias adjustment stages in one holding frame is also a way to realize the bias adjustment of the driving transistor.

Or, in the second data refresh period, when there are multiple holding frames, some holding frames have one or more bias adjustment stages, and other holding frames do not have a bias adjustment stage, which also can be a way to realize the bias adjustment of the driving transistor.

Or, the first bias adjustment stage can also be located in the data writing frame, and the i-th bias adjustment stage is located in an (i−1)-th holding frame.

Based on a variety of bias adjustment modes, in practical applications, a reasonable selection can be made according to actual conditions, which is not limited in the embodiments of the present disclosure.

Optionally, in another embodiment of the present disclosure, the data refresh frequency of the pixel circuit further includes a third data refresh frequency F33, F33<F22.

Figure 18:
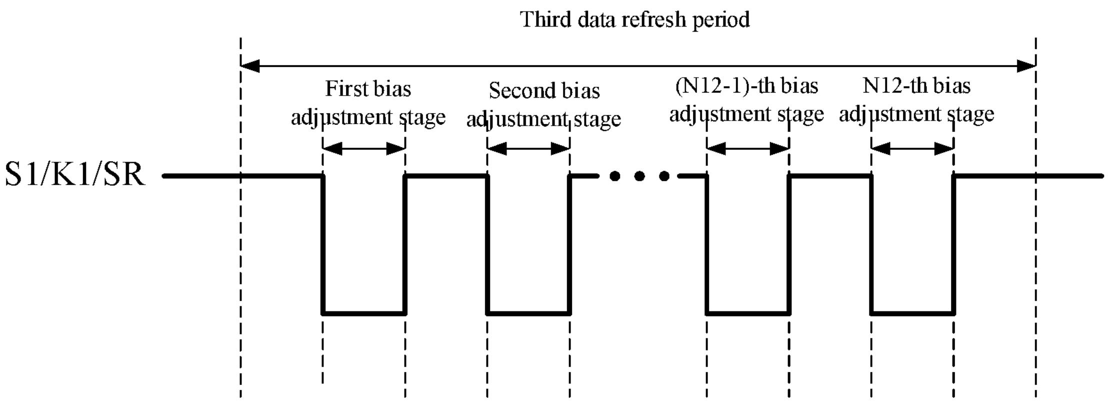
FIG. 18 is a partial timing diagram of another pixel circuit operation according to various embodiments of the present disclosure.

Referring to FIG. 18, FIG. 18 is a partial timing diagram of another pixel circuit operation according to various embodiments of the present disclosure. After the data refresh frequency of the pixel circuit is switched from the first data refresh frequency F11 to the third data refresh frequency F33, N12 bias adjustment stages are included in one third data refresh period, N12≥2. A first bias adjustment stage of the third data refresh period inputs a bias adjustment signal V12, and a j-th bias adjustment stage inputs a bias adjustment signal Vj, 1≤j≤N12, where, V12≠Vj.

Alternatively, after the data refresh frequency of the pixel circuit is switched from a high-frequency data refresh frequency to a low-frequency data refresh frequency, the bias adjustment signal in the first bias adjustment stage of the third data refresh period may be different from the bias adjustment signal in the j-th bias adjustment stage. In other words, it is tried to make the bias adjustment signal gradually change to a fixed value in a smooth transition mode, so as to avoid the problem of abnormal brightness to occur when the display panel is switched from the high-frequency data refresh rate driving mode to the low-frequency data refresh rate driving mode, which means that the screen flickering phenomenon is avoided and the visual experience is improved.

Optionally, in another embodiment of the present disclosure, bias adjustment signals inputted in i bias adjustment stages from the first bias adjustment stage to the i-th bias adjustment stage of the second data refresh period increase or decrease sequentially, and bias adjustment signals inputted in (N11−i+1) bias adjustment stages from the i-th bias adjustment stage to the N11-th bias adjustment stage are equal.

Bias adjustment signals inputted in j bias adjustment stages from the first bias adjustment stage to the j-th bias adjustment stage of the third data refresh period increase or decrease sequentially, and bias adjustment signals inputted in (N12−j+1) bias adjustment stages from the j-th bias adjustment stage to the N12-th bias adjustment stage are equal, where, i<j.

Alternatively, in the data refresh frequency of the pixel circuit, the first data refresh frequency F11 is greater than the second data refresh frequency F22 and is greater than the third data refresh frequency F33, that is, the second data refresh frequency F22 is higher than the third data refresh frequency F33, and the third data refresh frequency F33 is lower than the second data refresh frequency F22.

Because when a frequency is lower, a number of holding frames in a data refresh period is relatively more, in the data refresh period, a duration of a gate potential of a driving transistor remaining unchanged is longer, which can cause that ion polarization inside the driving transistor is increased, which in turn forms a built-in electric field inside the driving transistor, so that a threshold voltage of the driving transistor is caused to increase continuously, and the Ig-Vg curve is severely shifted, to make the threshold voltage of the driving transistor shift even more.

Therefore, in stages when the data refresh frequency is relatively lower, more bias adjustment stages are configured to gradually adjust the bias adjustment signal and stabilize it to a certain fixed value to minimize the problem of the threshold voltage of the driving transistor shifting more.

Exemplarily, in the second data refresh period, the bias adjustment signal is stabilized to a certain fixed value through five bias adjustment stages, and subsequent bias adjustment stages maintain an input of this bias adjustment signal.

In the third data refresh period, the bias adjustment signal is stabilized to a certain fixed value through 8 or 10 or more bias adjustment stages, and subsequent bias adjustment stages maintain an input of this bias adjustment signal.

Optionally, in another embodiment of the present disclosure, bias adjustment signals inputted in i bias adjustment stages from the first bias adjustment stage to the i-th bias adjustment stage of the second data refresh period increase or decrease sequentially with an equal difference ΔV1.

Bias adjustment signals inputted in j bias adjustment stages from the first bias adjustment stage to the j-th bias adjustment stage of the third data refresh period increase or decrease sequentially with an equal difference ΔV2, where, ΔV1>ΔV2.

Alternatively, in the data refresh frequency of the pixel circuit, the first data refresh frequency F11 is greater than the second data refresh frequency F22 and is greater than the third data refresh frequency F33, that is, the second data refresh frequency F22 is higher than the third data refresh frequency F33, and the third data refresh frequency F33 is lower than the second data refresh frequency F22.

Because when a frequency is lower, a number of holding frames in a data refresh period is relatively more, so in the data refresh period, a duration of a gate potential of a driving transistor remaining unchanged is longer, which can cause that ion polarization inside the driving transistor is increased, which in turn forms a built-in electric field inside the driving transistor, so that a threshold voltage of the driving transistor is caused to increase continuously, and the Ig-Vg curve is severely shifted, to make the threshold voltage of the driving transistor shift even more.

Therefore, when the bias adjustment signal adopts an arithmetic change mode, at stages when the data refresh frequency is relatively lower, a more gradual arithmetic change trend mode (i.e., $\Delta V2$ less than $\Delta V1$) needs to be adopted to gradually adjust the bias adjustment signal to be stabilized to a certain fixed value to minimize the problem of the threshold voltage of the driving transistor shifting more.

If $\Delta V2$ is large, a signal span received by the driving transistor is too large, the state of the driving transistor can easily become unstable, and the threshold voltage of the driving transistor cannot be adjusted well, thereby affecting the light-emitting state of the light-emitting element.

Optionally, in another embodiment of the present disclosure, a difference between bias adjustment signals inputted in two adjacent bias adjustment stages of i bias adjustment stages from the first bias adjustment stage to the i-th bias adjustment stage of the second data refresh period is greater than a difference between bias adjustment signals inputted in two adjacent bias adjustment stages of j bias adjustment stages from the first bias adjustment stage to the j-th bias adjustment stage of the third data refresh period.

Alternatively, in this embodiment of the present disclosure, the bias adjustment signal is not limited to be changed in an arithmetic manner. It is only necessary to ensure that a difference between bias adjustment signals inputted in two adjacent bias adjustment stages of the third data refresh period is smaller than a difference between bias adjustment signals inputted in two adjacent bias adjustment stages of the second data refresh period.

In other words, a variation amplitude of the bias adjustment signal in the third data refresh period is more gradual than a variation amplitude of the bias adjustment signal in the second data refresh period, so as to minimize the problem of the threshold voltage of the driving transistor shifting more.

It should be noted that a time length of the second data refresh period in the present disclosure is an inverse of the second data refresh frequency F22, and a time length of the third data refresh period is an inverse of the third data refresh frequency F33.

Optionally, in this embodiment, after switching from the first data refresh frequency F11 to the second data refresh frequency F22, the N11 bias adjustment stages may be included in the first data refresh period, or the N11 bias adjustment stages may be included in each of previous q data refresh periods, $q \geq 1$. In these two cases, for other data refresh periods, the bias adjustment stages can be set such that the bias adjustment signal of the first bias adjustment stage reaches the fixed value V0. Because of a transition of these data refresh periods, the driving transistor can be adapted to work at the second data refresh frequency, so that in other data refresh periods, there is no need to set a smooth transition mode. Alternatively, in other embodiments, when the display panel works at the second data refresh frequency, all data refresh periods can include the N11 bias adjustment stages, so as to ensure the stability of the driving transistor. Choices can be made according to specific situations.

Optionally, another aspect of the embodiments of the present disclosure provides another display panel. The display panel includes: a pixel circuit and a light-emitting element. The pixel circuit includes a driving transistor, and the driving transistor is configured to provide a driving current for the light-emitting element. A working process of the pixel circuit includes a data writing stage and a bias adjustment stage. In the data writing stage, a gate of the driving transistor receives a data signal, and in the bias adjustment stage, a source or drain of the driving transistor receives a bias adjustment signal. A frame refresh frequency of the pixel circuit is F1, and a frame includes a data writing frame and a holding frame. A data refresh frequency of the pixel circuit includes a first data refresh frequency F11 and a second data refresh frequency F22, where $F22 < F11 \leq F1$. After the data refresh frequency of the pixel circuit is switched from the first data refresh frequency F11 to the second data refresh frequency F22, one second data refresh period includes N11 bias adjustment stages, $N11 \geq 2$. A m-th bias adjustment stage of the second data refresh period inputs a bias adjustment signal Vm, and an n-th bias adjustment stage inputs a bias adjustment signal Vn, $1 \leq m \leq N11$, $1 \leq n \leq N11$, $m < n$; where, $Vm \neq Vn$.

In the present disclosure, when a high data refresh frequency is switched to a low data refresh frequency, multiple bias adjustment stages are set in a low data refresh period, and the bias adjustment signal of the m-th bias adjustment stage can be different from the bias adjustment signal of the n-th bias adjustment stage, that is to say, it is tried to make the bias adjustment signal gradually change to a fixed value in a smooth transition mode, so as to avoid the problem of abnormal brightness to occur when the display panel is switched from the high-frequency data refresh rate driving mode to the low-frequency data refresh rate driving mode, which means that the screen flickering phenomenon is avoided and the visual experience is improved.

A difference between this embodiment and the previous embodiments is that it is not limited whether m and n are the first bias adjustment stage, that is, in some cases, bias adjustment signals of different bias adjustment stages can be set to be adjustable. Therefore, a specific bias adjustment signal can be set according to specific needs, which all fall within the protection scope of the present disclosure.

Based on this, in this embodiment, the data signal written in the data writing frame in the second data refresh period is Vdata, where $|Vm-Vdata| < |Vn-Vdata|$. In one embodiment of the present disclosure, $|Vm-Vdata| > |Vn-Vdata|$. Because $m < n$, setting $|Vm-Vdata| < |Vn-Vdata|$ can make the bias adjustment signal gradually change to a fixed value in a smooth transition manner, so that a difference between the bias adjustment signal and Vdata gradually increases, which does not cause a sudden change in the signal to cause a greater impact on the driving transistor whose threshold voltage has been shifted.

In addition, in this embodiment, when the driving transistor is a PMOS transistor, $Vm < Vn$; or, when the driving transistor is an NMOS transistor, $Vm > Vn$. In one embodiment of the present disclosure, when the driving transistor is a PMOS transistor, Vm>Vn; or, when the driving transistor is an NMOS transistor, Vm<Vn.

Because m<n, the above setting can make the bias adjustment signal gradually change to a fixed value in a smooth transition manner, so that the bias adjustment signal gradually increases or decreases, so as not to cause a sudden change in the signal to cause a greater impact on the driving transistor whose threshold voltage has been shifted.

Compared with existing technologies, the present disclosure achieves the following beneficial effects.

A display panel provided by the present disclosure adjusts a drain potential of a driving transistor and improves a potential difference between a gate potential and the drain potential of the driving transistor, by setting a bias adjustment stage and inputting a bias adjustment signal at a source or drain of the driving transistor, thereby offsetting a problem of a bias of the gate potential and the drain potential caused by the driving transistor working in a non-saturated state during a light-emitting stage, avoiding Id-Vg curve drift of the driving transistor, and avoiding shifting of a threshold voltage of the driving transistor. Further, in the present disclosure, when a data refresh frequency is reduced from a high data refresh frequency to a low data refresh frequency, multiple bias adjustment stages can be set in a low data refresh period, and a bias adjustment signal of each bias adjustment stage can be different, that is, it is tried to make the bias adjustment signal gradually change to a fixed value in a gradual transition mode, so as to avoid the problem of abnormal brightness to occur when the display panel is switched from a high-frequency data refresh rate driving mode to a low-frequency data refresh rate driving mode, which means that the screen flickering phenomenon is avoided and the visual experience is improved.

It should be noted that, in this embodiment, only definitions of m and n are different from those in the foregoing embodiments, and the pixel circuit and related timing are similar to those in the foregoing embodiments, which can be referred to and are not repeated here.

Figure 19:
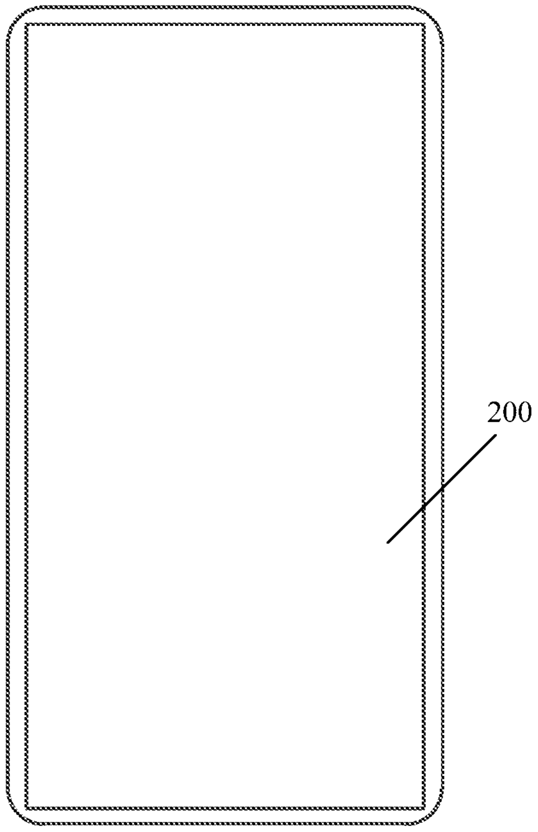
FIG. 19 is a schematic structural diagram of a display device according to various embodiments of the present disclosure.

Optionally, based on all the foregoing embodiments of the present disclosure, a display device is also provided in another embodiment of the present disclosure. Referring to FIG. 19, FIG. 19 is a schematic structural diagram of a display device according to various embodiments of the present disclosure.

The display device includes any one of the display panels 200 provided in the above-mentioned embodiments.

Since the display device provided by the embodiments of the present disclosure includes any one of the display panels provided in the foregoing embodiments, the display device has same or corresponding technical effects as the display panels provided in the foregoing embodiments.

The display device may alternatively be a mobile phone, a computer, and other electronic equipment.

The above is a detailed introduction to a display panel and a display device provided by the present disclosure. In this specification, alternative examples are used to describe principles and implementations of the present disclosure. The description of the above embodiments is only used to help understand methods and core ideas of the present disclosure. At the same time, for those of ordinary skill in the art, according to the ideas of the present disclosure, there can be changes in specific implementations and scopes of applications. In summary, the content of this specification should not be construed as limiting the present disclosure.

It should also be noted that in the present disclosure, relational terms such as first and second are only used to distinguish one entity or operation from another entity or operation, and do not necessarily require or imply that there is any such actual relationship or order between these entities or operations. Moreover, terms “include”, “includes” or any other variants thereof are intended to cover non-exclusive inclusion, so that a process, method, article, or device including a series of elements also includes elements inherent in the process, method, article, or device. If there are no more restrictions, an element defined by a sentence “including a . . . ” does not exclude existence of other identical elements in a process, method, article, or device that includes the element.

The above description of the disclosed embodiments enables those skilled in the art to implement or use the present disclosure. Various modifications to these embodiments will be obvious to those skilled in the art, and general principles defined herein can be implemented in other embodiments without departing from the spirit or scope of the present disclosure. Therefore, the present disclosure will not be limited to the embodiments shown in this specification, but should conform to the widest scope consistent with the principles and novel features disclosed in this specification.

What is claimed is:

1. A display panel, comprising:

a pixel circuit, and a light-emitting element, wherein:

the pixel circuit includes a driving transistor configured to provide a driving current for the light-emitting element;

a working process of the pixel circuit includes a data writing stage and a bias adjustment stage, wherein a gate of the driving transistor receives a data signal in the data writing stage, and a source or drain of the driving transistor receives a bias adjustment signal in the bias adjustment stage;

a frame refresh frequency of the pixel circuit is F1, and a frame includes a data writing frame and a holding frame; and a data refresh frequency of the pixel circuit includes a first data refresh frequency F11 and a second data refresh frequency F22, F22<F11≤F1, wherein:

at least one second data refresh period includes N11 bias adjustment stages, N11≥2, a bias adjustment signal V11 is inputted in a first bias adjustment stage of the second data refresh period, and a bias adjustment signal Vi is inputted in an i-th bias adjustment stage, 1<i≤N11, wherein: V11≠Vi and the bias adjustment signal V11 input in the first bias adjustment stage satisfies 5V≤V11≤6.5V; or the bias adjustment signal Vi input in the i-th bias adjustment stage satisfies 5V≤Vi≤6.5V.

2. The display panel according to claim 1, wherein:

the pixel circuit includes a data writing module, and the data writing module is connected to a data signal line;

in the data writing stage, the data writing module is turned on, and the data signal line writes the data signal to the gate of the driving transistor; and in the bias adjustment stage, the data writing module is turned on, and the data signal line writes the bias adjustment signal to the source or drain of the driving transistor.

3. The display panel according to claim 1, wherein:

the pixel circuit includes a data writing module and a bias adjustment module, the data writing module is connected to a data signal line, and the bias adjustment module is connected to a bias adjustment signal line;

in the data writing stage, the data writing module is turned on, and the data signal line writes the data signal to the gate of the driving transistor; and in the bias adjustment stage, the bias adjustment module is turned on, and the bias adjustment signal line writes the bias adjustment signal to the source or drain of the driving transistor.

4. The display panel according to claim 1, wherein:

the data signal written in the data writing frame in the second data refresh period is Vdata, wherein:

$$|V11-V\text{data}|<|Vi-V\text{data}|.$$

5. The display panel according to claim 4, wherein:

a difference between Vdata and bias adjustment signals inputted in i bias adjustment stages from the first bias adjustment stage to the i-th bias adjustment stage of the second data refresh period increases sequentially.

6. The display panel according to claim 1, wherein:

bias adjustment signals inputted in (N-i+1) bias adjustment stages from the i-th bias adjustment stage to an N-th bias adjustment stage of the second data refresh period are equal, being a preset bias adjustment signal V0.

7. The display panel according to claim 1, wherein:

in i bias adjustment stages from the first bias adjustment stage to the i-th bias adjustment stage of the second data refresh period, a difference between bias adjustment signals inputted in adjacent bias adjustment stages increases gradually.

8. The display panel according to claim 1, wherein:

in i bias adjustment stages from the first bias adjustment stage to the i-th bias adjustment stage of the second data refresh period, a difference between bias adjustment signals inputted in adjacent bias adjustment stages decreases gradually.

9. The display panel according to claim 1, wherein the first bias adjustment stage is in the data writing frame.

10. The display panel according to claim 9, wherein:

in the at least one second data refresh period, the first bias adjustment stage is after a data writing stage of the data writing frame.

11. The display panel according to claim 1, wherein the i-th bias adjustment stage is in the holding frame.

12. The display panel according to claim 1, wherein the first bias adjustment stage is in the data writing frame, and the i-th bias adjustment stage is in an (i-1)-th holding frame.

13. The display panel according to claim 1, wherein in the second data refresh period, the holding frame includes a plurality of bias adjustment stages.

14. The display panel according to claim 1, wherein in the at least one second data refresh period, the first bias adjustment stage is after a data writing stage of the data writing frame.

15. The display panel according to claim 1, wherein:

in response to the driving transistor being a PMOS transistor, a potential of at least one bias adjustment signal is higher than the data signal Vdata written in the data writing frame in the second data refresh period; or in response to the driving transistor being an NMOS transistor, a potential of the bias adjustment signal is lower than the data signal Vdata written in the data writing frame in the second data refresh period.

16. The display panel according to claim 1, wherein:

when the pixel circuit works at the second data refresh frequency F22, the second data refresh period includes one data writing frame and r holding frames, and r≥1; and the holding frames include the bias adjustment stages.

17. The display panel according to claim 16, wherein:

in the second data refresh period, the first bias adjustment stage is in a first holding frame, and the i-th bias adjustment stage is in an i-th holding frame.

18. The display panel according to claim 1, wherein:

the data refresh frequency of the pixel circuit also includes a third data refresh frequency F33, F33<F22; wherein:

after the data refresh frequency of the pixel circuit is switched from the first data refresh frequency F11 to the third data refresh frequency F33, one third data refresh period includes N12 bias adjustment stages, N12≥2, a bias adjustment signal V12 is inputted in a first bias adjustment stage of the third data refresh period, and a bias adjustment signal Vj is inputted in a j-th bias adjustment stage, 1≤j≤N12, wherein:

$$V12\neq Vj.$$

19. The display panel according to claim 18, wherein:

bias adjustment signals inputted in i bias adjustment stages from the first bias adjustment stage to the i-th bias adjustment stage of the second data refresh period increase or decrease sequentially with an equal difference ΔV1; and bias adjustment signals inputted in j bias adjustment stages from the first bias adjustment stage to the j-th bias adjustment stage of the third data refresh period increase or decrease sequentially with an equal difference ΔV2, wherein:

$$\Delta V1>\Delta V2.$$

20. The display panel according to claim 18, wherein:

a difference between bias adjustment signals inputted in two adjacent bias adjustment stages of i bias adjustment stages from the first bias adjustment stage to the i-th bias adjustment stage of the second data refresh period is greater than a difference between bias adjustment signals inputted in two adjacent bias adjustment stages of j bias adjustment stages from the first bias adjustment stage to the j-th bias adjustment stage of the third data refresh period.

21. The display panel according to claim 18, wherein:

bias adjustment signals inputted in i bias adjustment stages from the first bias adjustment stage to the i-th bias adjustment stage of the second data refresh period increase or decrease sequentially, and bias adjustment signals inputted in (N11-i+1) bias adjustment stages from the i-th bias adjustment stage to an N11-th bias adjustment stage are equal; and bias adjustment signals inputted in j bias adjustment stages from the first bias adjustment stage to the j-th bias adjustment stage of the third data refresh period increase or decrease sequentially, and bias adjustment signals inputted in (N12-j+1) bias adjustment stages from the j-th bias adjustment stage to an N12-th bias adjustment stage are equal.

22. The display panel according to claim 21, wherein i<j.

23. The display panel according to claim 1, wherein the at least one second data refresh period is after the data refresh frequency of the pixel circuit is switched from the first data refresh frequency F11 to the second data refresh frequency F22.

24. A display device comprising a display panel of any one of claim 1.

25. A display panel, comprising:

a pixel circuit, and a light-emitting element, wherein:

the pixel circuit includes a driving transistor configured to provide a driving current for the light-emitting element;

a working process of the pixel circuit includes a data writing stage and a bias adjustment stage, wherein a gate of the driving transistor receives a data signal in the data writing stage, and a source or drain of the driving transistor receives a bias adjustment signal in the bias adjustment stage;

the pixel circuit includes different data refresh frequencies, wherein:

at least one data refresh period includes N11 bias adjustment stages, N11≥2, a bias adjustment signal V11 is inputted in a first bias adjustment stage of the data refresh period, and a bias adjustment signal Vi is inputted in an i-th bias adjustment stage, 1<i≤N11, wherein:

$$V11 \neq Vi.$$

26. The display panel according to claim 25, wherein:

the bias adjustment signal V11 input in the first bias adjustment stage satisfies 5V≤V11≤6.5V; or the bias adjustment signal Vi input in the i-th bias adjustment stage satisfies 5V≤Vi≤6.5V.

27. A display panel, comprising:

a pixel circuit, and a light-emitting element, wherein:

the pixel circuit includes a driving transistor configured to provide a driving current for the light-emitting element;

a working process of the pixel circuit includes a data writing stage and a bias adjustment stage, wherein a gate of the driving transistor receives a data signal in the data writing stage, and a source or drain of the driving transistor receives a bias adjustment signal in the bias adjustment stage;

a data refresh frequency of the pixel circuit includes a first data refresh frequency F11, a second data refresh frequency F22, a third data refresh frequency F33, F33<F22<F11, wherein:

after the data refresh frequency of the pixel circuit is switched from the first data refresh frequency F11 to the second data refresh frequency F22, one second data refresh period includes N11 bias adjustment stages, N11≥2, a bias adjustment signal V11 input in a first bias adjustment stage of the second data refresh period, a bias adjustment signal Vi input in an i-th bias adjustment stage, 1<i≤N11;

after the data refresh frequency of the pixel circuit is switched from the first data refresh frequency F11 to the third data refresh frequency F33, one third data refresh period includes N12 bias adjustment stages, N12≥2, a bias adjustment signal V12 input in a first bias adjustment stage of the third data refresh period, a bias adjustment signal Vj input in a j-th bias adjustment stage, 1<j≤N12;

bias adjustment signals input in i bias adjustment stages between the first bias adjustment stage to the i-th bias adjustment stage of the second data refresh period decrease sequentially; and bias adjustment signals input in j bias adjustment stages between the first bias adjustment stage to the j-th bias adjustment stage of the third data refresh period decrease sequentially.

28. The display panel according to claim 27, wherein:

bias adjustment signals input in (N11-i+1) bias adjustment stages between the i-th bias adjustment stage and N11-th bias adjustment stage are equal; and bias adjustment signals input in (N12-j+1) bias adjustment stages between the j-th bias adjustment stage and N12-th bias adjustment stage are equal.

29. The display panel according to claim 27, wherein:

the bias adjustment signal V11 input in the first bias adjustment stage satisfies 5V≤V11≤6.5V; or the bias adjustment signal Vi input in the i-th bias adjustment stage satisfies 5V≤Vi≤6.5V.

* * * * *